US012661920B2

(12) United States Patent
Koike et al.

(10) Patent No.: US 12,661,920 B2
(45) Date of Patent: Jun. 23, 2026

(54) RECORDING METHOD AND RECORDING APPARATUS

(71) Applicant: SEIKO EPSON CORPORATION, Tokyo (JP)

(72) Inventors: Naoki Koike, Matsumoto (JP); Ippei Okuda, Shiojiri (JP)

(73) Assignee: SEIKO EPSON CORPORATION (JP)

( * ) Notice: Subject to any disclaimer, the term of this patent is extended or adjusted under 35 U.S.C. 154(b) by 227 days.

(21) Appl. No.: 18/617,681

(22) Filed: Mar. 27, 2024

(65) Prior Publication Data
US 2024/0326499 A1      Oct. 3, 2024

(30) Foreign Application Priority Data

Mar. 28, 2023      (JP) ................................. 2023-051182

(51) Int. Cl.
*B41M 3/00* (2006.01)
*B41J 2/21* (2006.01)
*B41M 5/00* (2006.01)
*C09D 11/40* (2014.01)
*C09D 11/54* (2014.01)

(52) U.S. Cl.
CPC ........... *B41M 3/008* (2013.01); *B41J 2/2117* (2013.01); *B41M 5/0017* (2013.01); *C09D 11/40* (2013.01); *C09D 11/54* (2013.01)

(58) Field of Classification Search
CPC ...................................................... B41M 3/008
USPC ........................................................... 347/21
See application file for complete search history.

(56) References Cited

U.S. PATENT DOCUMENTS

| | | | |
|---|---|---|---|
| 2011/0311290 A1* | 12/2011 | Castells | ................... B41J 11/42 |
| | | | 400/582 |
| 2018/0030300 A1 | 2/2018 | Ohta | |
| 2021/0062027 A1* | 3/2021 | Watanabe | .............. C09D 11/54 |
| 2021/0252873 A1* | 8/2021 | Ando | .................... B41J 2/2117 |

FOREIGN PATENT DOCUMENTS

JP            2018-015968 A        2/2018

* cited by examiner

*Primary Examiner* — Douglas X Rodriguez
*Assistant Examiner* — Rami A Alshoroogi
(74) *Attorney, Agent, or Firm* — Harness, Dickey & Pierce, P.L.C.

(57) ABSTRACT

A recording method includes a treatment liquid attachment step, a white ink attachment step, and a non-white ink attachment step. The white ink attachment step and the non-white ink attachment step are each performed by scanning while the ink jet head is moved with respect to the recording medium in a state where a position is fixed. The white ink composition is attached to a scanning region in one scanning and, the non-white ink composition is attached to a scanning region in one scanning. Scanning in another step is performed by another scanning, and in the white ink attachment step and the non-white ink attachment step, a surface temperature of the recording medium is 35° C. or lower.

12 Claims, 11 Drawing Sheets

FIG. 3

TABLE 1:

| | | | TREATMENT LIQUID | | | WHITE INK COMPOSITION | | | | NON-WHITE INK COMPOSITION | | |
|---|---|---|---|---|---|---|---|---|---|---|---|---|
| | | | R1 | R2 | R3 | W1 | W2 | W3 | W4 | C1 | C2 | C3 |
| AGGREGATING AGENT | | CALCIUM FORMATE | 7.0 | | | | | | | | | |
| | | CATIONIC POLYMER | | 4.0 | | | | | | | | |
| | | MALONIC ACID | | | 7.0 | | | | | | | |
| WHITE | WHITE PIGMENT | TITANIUM DIOXIDE | | | | 10.0 | 10.0 | 10.0 | 10.0 | | | |
| | WHITE DISPERSANT RESIN | RESIN A (ANIONIC) | | | | 3.0 | 3.0 | 3.0 | 3.0 | | | |
| COLOR | COLOR PIGMENT | CARBON BLACK | | | | | | | | 3.0 | 3.0 | 3.0 |
| | DISPERSANT RESIN | RESIN C (ANIONIC) | | | | | | | | 2.0 | 2.0 | 2.0 |
| RESIN PARTICLE | | STYRENE-ACRYLIC A | | | | 5.0 | 5.0 | 5.0 | | 5.0 | 5.0 | 5.0 |
| | | STYRENE-ACRYLIC B | | | | | | | 5.0 | | | |
| WAX | | POLYETHYLENE-BASED | | | | 1.0 | 1.0 | 1.0 | 1.0 | 1.0 | 1.0 | 1.0 |
| SURFACTANT | | SILICONE-BASED | 1.0 | 1.0 | 1.0 | 1.0 | 1.0 | 1.0 | 1.0 | 1.0 | 1.0 | 1.0 |
| ORGANIC SOLVENT | | 2-PYRROLIDONE | 15.0 | 15.0 | 15.0 | 10.0 | 15.0 | 5.0 | 10.0 | 15.0 | 15.0 | 12.0 |
| | | PROPYLENE GLYCOL | 15.0 | 15.0 | 15.0 | 10.0 | 15.0 | 5.0 | 10.0 | 10.0 | 13.0 | 10.0 |
| WATER | | PURE WATER | 62.0 | 65.0 | 62.0 | 60.0 | 50.0 | 70.0 | 60.0 | 63.0 | 60.0 | 66.0 |
| TOTAL | | | 100 | 100 | 100 | 100 | 100 | 100 | 100 | 100 | 100 | 100 |
| THICKENING RATIO [TIMES] WHEN MIXED WITH TEST LIQUID UNDER SAME CONDITIONS AS R1 | | | — | — | — | 10 | 10 | 10 | 7 | 10 | 10 | 10 |

FIG. 4A

TABLE 2-1:

| | | EXAMPLE 1 | | | EXAMPLE 2 | | | EXAMPLE 3 | | | EXAMPLE 4 | | | EXAMPLE 5 | | | EXAMPLE 6 | | | EXAMPLE 7 | | |
|---|---|---|---|---|---|---|---|---|---|---|---|---|---|---|---|---|---|---|---|---|---|---|
| | | TREATMENT LIQUID | WHITE | NON-WHITE | TREATMENT LIQUID | WHITE | NON-WHITE | TREATMENT LIQUID | WHITE | NON-WHITE | TREATMENT LIQUID | WHITE | NON-WHITE | TREATMENT LIQUID | WHITE | NON-WHITE | TREATMENT LIQUID | WHITE | NON-WHITE | TREATMENT LIQUID | WHITE | NON-WHITE |
| PRINTING CONDITION | COMPOSITION | R1 | W1 | C1 | R2 | W1 | C1 | R3 | W1 | C1 | R1 | W2 | C1 | R1 | W3 | C1 | R1 | W4 | C1 | R1 | W1 | C1 |
| | MEDIUM SURFACE TEMPERATURE | 25℃ | | | 25℃ | | | 25℃ | | | 25℃ | | | 25℃ | | | 25℃ | | | 25℃ | | |
| | HEAD MOVEMENT DISTANCE | 0.5 m | | | 0.5 m | | | 0.5 m | | | 0.5 m | | | 0.5 m | | | 0.5 m | | | 0.5 m | | |
| | FIRST LAYER FIRST PASS — Iw [ng/dot] | 3 | 13 | - | 3 | 13 | - | 3 | 13 | - | 3 | 13 | - | 3 | 13 | - | 3 | 13 | - | 3 | 13 | - |
| | FIRST LAYER FIRST PASS — ATTACHMENT AMOUNT [mg/inch²] | 1.1 | 15.0 | - | 1.1 | 15.0 | - | 1.1 | 15.0 | - | 1.1 | 15.0 | - | 1.1 | 15.0 | - | 1.1 | 15.0 | - | 1.1 | 8.0 | - |
| | FIRST LAYER SECOND PASS — Iw [ng/dot] | - | - | - | - | - | - | - | - | - | - | - | - | - | - | - | - | - | - | - | - | - |
| | FIRST LAYER SECOND PASS — ATTACHMENT AMOUNT [mg/inch²] | - | - | - | - | - | - | - | - | - | - | - | - | - | - | - | - | - | - | - | - | - |
| | SECOND LAYER FIRST PASS — Iw [ng/dot] | 3 | - | 6 | 3 | - | 6 | 3 | - | 6 | 3 | - | 6 | 3 | - | 6 | 3 | - | 6 | 3 | - | 6 |
| | SECOND LAYER FIRST PASS — ATTACHMENT AMOUNT [mg/inch²] | 0.5 | - | 6.9 | 0.5 | - | 6.9 | 0.5 | - | 6.9 | 0.5 | - | 6.9 | 0.5 | - | 6.9 | 0.5 | - | 6.9 | 0.5 | - | 6.9 |
| EVALUATION CONTENTS | FILLING PROPERTY・PINHOLE | - | A | A | - | B | B | - | A | A | - | B | A | - | A | A | - | A | A | - | B | A |
| | DENSITY UNEVENNESS | - | A | A | - | A | A | - | B | B | - | A | A | - | B | A | - | B | A | - | A | A |
| | 3pt CHARACTER | - | A | A | - | B | B | - | B | A | - | A | A | - | A | A | - | B | A | - | A | A |
| | DEW CONDENSATION EVALUATION | A | A | A | A | A | A | A | A | A | A | A | A | A | A | A | A | A | A | A | A | A |
| | RECORDING SPEED | A | | | A | | | A | | | A | | | A | | | A | | | A | | |

FIG. 4B

TABLE 2-2:

| | | EXAMPLE 8 | | | EXAMPLE 9 | | | EXAMPLE 10 | | | EXAMPLE 11 | | | EXAMPLE 12 | | | EXAMPLE 13 | | | EXAMPLE 14 | | |
|---|---|---|---|---|---|---|---|---|---|---|---|---|---|---|---|---|---|---|---|---|---|---|
| | | TREATMENT LIQUID | WHITE | NON-WHITE | TREATMENT LIQUID | WHITE | NON-WHITE | TREATMENT LIQUID | WHITE | NON-WHITE | TREATMENT LIQUID | WHITE | NON-WHITE | TREATMENT LIQUID | WHITE | NON-WHITE | TREATMENT LIQUID | WHITE | NON-WHITE | TREATMENT LIQUID | WHITE | NON-WHITE |
| PRINTING CONDITION | COMPOSITION | R1 | W1 | C1 | R1 | W1 | C2 | R1 | W1 | C3 | R1 | W1 | C1 | R1 | W1 | C1 | R1 | W1 | C1 | R1 | W1 | C1 |
| | MEDIUM SURFACE TEMPERATURE | 25°C | | | 25°C | | | 25°C | | | 25°C | | | 28°C | | | 33°C | | | 33°C | | |
| | HEAD MOVEMENT DISTANCE | 0.5 m | | | 0.5 m | | | 0.5 m | | | 2.0 m | | | 0.5 m | | | 0.5 m | | | 2.0 m | | |
| | FIRST LAYER FIRST PASS — Iw [ng/dot] | 7.5 | 13 | 6 | 3 | 13 | 6 | 3 | 13 | 6 | 3 | 13 | 6 | 3 | 13 | 6 | 3 | 13 | 6 | 3 | 13 | 6 |
| | FIRST LAYER FIRST PASS — ATTACHMENT AMOUNT [mg/inch²] | 1.1 | 15.0 | 6.9 | 1.1 | 15.0 | 6.9 | 1.1 | 15.0 | 6.9 | 1.1 | 15.0 | 6.9 | 1.1 | 15.0 | 6.9 | 1.1 | 15.0 | 6.9 | 1.1 | 15.0 | 6.9 |
| | FIRST LAYER SECOND PASS — Iw [ng/dot] | - | - | - | - | - | - | - | - | - | - | - | - | - | - | - | - | - | - | - | - | - |
| | FIRST LAYER SECOND PASS — ATTACHMENT AMOUNT [mg/inch²] | - | - | - | - | - | - | - | - | - | - | - | - | - | - | - | - | - | - | - | - | - |
| | SECOND LAYER FIRST PASS — Iw [ng/dot] | 7.5 | - | 6 | 3 | - | 6 | 3 | - | 6 | 3 | - | 6 | 3 | - | 6 | 3 | - | 6 | 3 | - | 6 |
| | SECOND LAYER FIRST PASS — ATTACHMENT AMOUNT [mg/inch²] | 0.5 | - | 6.9 | 0.5 | - | 6.9 | 0.5 | - | 6.9 | 0.5 | - | 6.9 | 0.5 | - | 6.9 | 0.5 | - | 6.9 | 0.5 | - | 6.9 |
| EVALUATION CONTENTS | FILLING PROPERTY · PINHOLE | - | B | B | - | A | B | - | A | A | - | A | A | - | A | B | - | B | B | - | B | B |
| | DENSITY UNEVENNESS | - | A | A | - | A | A | - | A | B | - | A | A | - | A | A | - | A | A | - | A | A |
| | 3pt CHARACTER | - | B | B | - | A | A | - | A | A | - | A | A | - | A | A | - | A | B | - | A | B |
| | DEW CONDENSATION EVALUATION | A | A | A | A | A | A | A | A | A | A | A | A | A | A | A | B | B | B | C | C | C |
| | RECORDING SPEED | A | | | A | | | A | | | A | | | A | | | A | | | A | | |

FIG. 5A

TABLE 3-1:

| | EXAMPLE 15 | | | EXAMPLE 16 | | | EXAMPLE 17 | | | EXAMPLE 18 | | | EXAMPLE 19 | | | COMPARATIVE EXAMPLE 1 | | | COMPARATIVE EXAMPLE 2 | | |
|---|---|---|---|---|---|---|---|---|---|---|---|---|---|---|---|---|---|---|---|---|---|
| | TREATMENT LIQUID | WHITE | NON-WHITE | TREATMENT LIQUID | WHITE | NON-WHITE | TREATMENT LIQUID | WHITE | NON-WHITE | TREATMENT LIQUID | WHITE | NON-WHITE | TREATMENT LIQUID | WHITE | NON-WHITE | TREATMENT LIQUID | WHITE | NON-WHITE | TREATMENT LIQUID | WHITE | NON-WHITE |
| PRINTING CONDITION | | | | | | | | | | | | | | | | | | | | | |
| COMPOSITION | R1 | W1 | C1 | R1 | W1 | C1 | R1 | W2 | C1 | R1 | W1 | C1 | R1 | W1 | C1 | R1 | W1 | C1 | NONE | W1 | C1 |
| MEDIUM SURFACE TEMPERATURE | 33°C | | | 33°C | | | 33°C | | | 33°C | | | 33°C | | | 45°C | | | 25°C | | |
| HEAD MOVEMENT DISTANCE | 0.3 m | | | 0.5 m | | | 0.5 m | | | 0.5 m | | | 0.5 m | | | 0.5 m | | | 0.5 m | | |
| FIRST LAYER / FIRST PASS — Iw [ng/dot] | 3 | 13 | - | 3 | 13 | - | 3 | 13 | - | 3 | - | 13 | 3 | 7 | - | 3 | 13 | - | - | 13 | - |
| FIRST LAYER / FIRST PASS — ATTACHMENT AMOUNT [mg/inch²] | 1.1 | 15.0 | - | 1.1 | 18.0 | - | 1.1 | 15.0 | - | 1.1 | - | 15.0 | 1.1 | 15.0 | - | 1.1 | 15.0 | - | - | 15.0 | - |
| FIRST LAYER / SECOND PASS — Iw [ng/dot] | - | - | - | - | - | - | - | - | - | - | - | - | - | - | - | - | - | - | - | - | - |
| FIRST LAYER / SECOND PASS — ATTACHMENT AMOUNT [mg/inch²] | - | - | - | - | - | - | - | - | - | - | - | - | - | - | - | - | - | - | - | - | - |
| SECOND LAYER / FIRST PASS — Iw [ng/dot] | 3 | - | 6 | 3 | - | 6 | 3 | - | 6 | 3 | 13 | - | 3 | - | 6 | 3 | - | 6 | - | - | 6 |
| SECOND LAYER / FIRST PASS — ATTACHMENT AMOUNT [mg/inch²] | 0.5 | - | 6.9 | 0.5 | - | 6.9 | 0.5 | - | 6.9 | 0.5 | 18.0 | - | 0.5 | - | 6.9 | 0.5 | - | 6.9 | - | - | 6.9 |
| EVALUATION CONTENTS | | | | | | | | | | | | | | | | | | | | | |
| FILLING PROPERTY - PINHOLE | - | B | B | - | A | B | - | B | B | - | A | A | - | B | B | - | C | C | - | A | A |
| DENSITY / UNEVENNESS | - | A | A | - | B | B | - | A | A | - | B | B | - | A | A | - | A | A | - | C | C |
| 3pt CHARACTER | - | A | B | - | B | B | A | A | B | - | B | A | - | A | B | - | B | B | - | C | C |
| DEW CONDENSATION EVALUATION | A | A | A | C | C | C | A | A | A | B | B | B | C | C | C | D | D | D | A | A | A |
| RECORDING SPEED | A | | | A | | | A | | | A | | | A | | | A | | | A | | |

FIG. 5B

TABLE 3-2:

| | | | COMPARATIVE EXAMPLE 3 | | | COMPARATIVE EXAMPLE 4 | | | COMPARATIVE EXAMPLE 5 | | | REFERENCE EXAMPLE 1 | | | REFERENCE EXAMPLE 2 | | | REFERENCE EXAMPLE 3 | | | REFERENCE EXAMPLE 4 | | |
|---|---|---|---|---|---|---|---|---|---|---|---|---|---|---|---|---|---|---|---|---|---|---|---|---|
| | | | TREATMENT LIQUID | WHITE | NON-WHITE | TREATMENT LIQUID | WHITE | NON-WHITE | TREATMENT LIQUID | WHITE | NON-WHITE | TREATMENT LIQUID | WHITE | NON-WHITE | TREATMENT LIQUID | WHITE | NON-WHITE | TREATMENT LIQUID | WHITE | NON-WHITE | TREATMENT LIQUID | WHITE | NON-WHITE |
| COMPOSITION | | | R1 | W1 | C1 | R1 | W1 | C1 | R3 | W1 | C1 | R1 | NONE | C1 | R1 | NONE | C1 | R1 | W1 | C1 | R1 | W1 | C1 |
| MEDIUM SURFACE TEMPERATURE | | | 40°C | | | 45°C | | | 25°C | | | 45°C | | | 25°C | | | 45°C | | | 25°C | | |
| HEAD MOVEMENT DISTANCE | | | 0.5 m | | | 0.5 m | | | 0.5 m | | | 0.5 m | | | 0.5 m | | | (FIRST PASS) | | | (FIRST PASS) | | |
| PRINTING CONDITION | FIRST LAYER | Iw [ng/dot] | 3 | 13 | - | 3 | 13 | - | 3 | 13 | - | 3 | - | 6 | 3 | - | 6 | 3 | 13 | - | 3 | 13 | - |
| | FIRST PASS | ATTACHMENT AMOUNT [mg/inch²] | 0.6 | 7.5 | - | 0.6 | 7.5 | - | 0.6 | 7.5 | - | 0.5 | - | 6.9 | 1.1 | - | 15.0 | 1.1 | 15.0 | - | 1.1 | 15.0 | - |
| | FIRST LAYER | Iw [ng/dot] | 3 | 13 | - | 3 | 13 | - | 3 | 13 | - | - | - | - | - | - | - | - | - | - | - | - | - |
| | SECOND PASS | ATTACHMENT AMOUNT [mg/inch²] | 0.6 | 7.5 | - | 0.6 | 7.5 | - | 0.6 | 7.5 | - | - | - | - | - | - | - | - | - | - | - | - | - |
| | SECOND LAYER | Iw [ng/dot] | 3 | - | 6 | 3 | - | 6 | 3 | - | 6 | - | - | | 3 | - | | 3 | - | 6 | 3 | - | 6 |
| | FIRST PASS | ATTACHMENT AMOUNT [mg/inch²] | 0.25 | - | 3.45 | 0.25 | - | 3.45 | 0.25 | - | 3.45 | | | | | | | 0.5 | - | 6.9 | 0.5 | - | 6.9 |
| EVALUATION CONTENTS | | FILLING PROPERTY - PINHOLE | - | A | A | - | A | A | - | A | A | - | - | C | - | - | A | - | C | C | - | A | A |
| | | DENSITY UNEVENNESS | - | A | A | - | A | A | - | A | B | - | - | A | - | - | A | - | A | A | - | B | B |
| | | 3pt CHARACTER | - | A | A | - | A | A | - | A | A | - | - | B | - | - | A | - | B | B | - | B | A |
| | | DEW CONDENSATION EVALUATION | B | B | B | C | C | C | A | A | A | A | - | A | A | - | A | A | A | A | A | A | A |
| | | RECORDING SPEED | B | | | B | | | B | | | A | | | A | | | A | | | A | | |

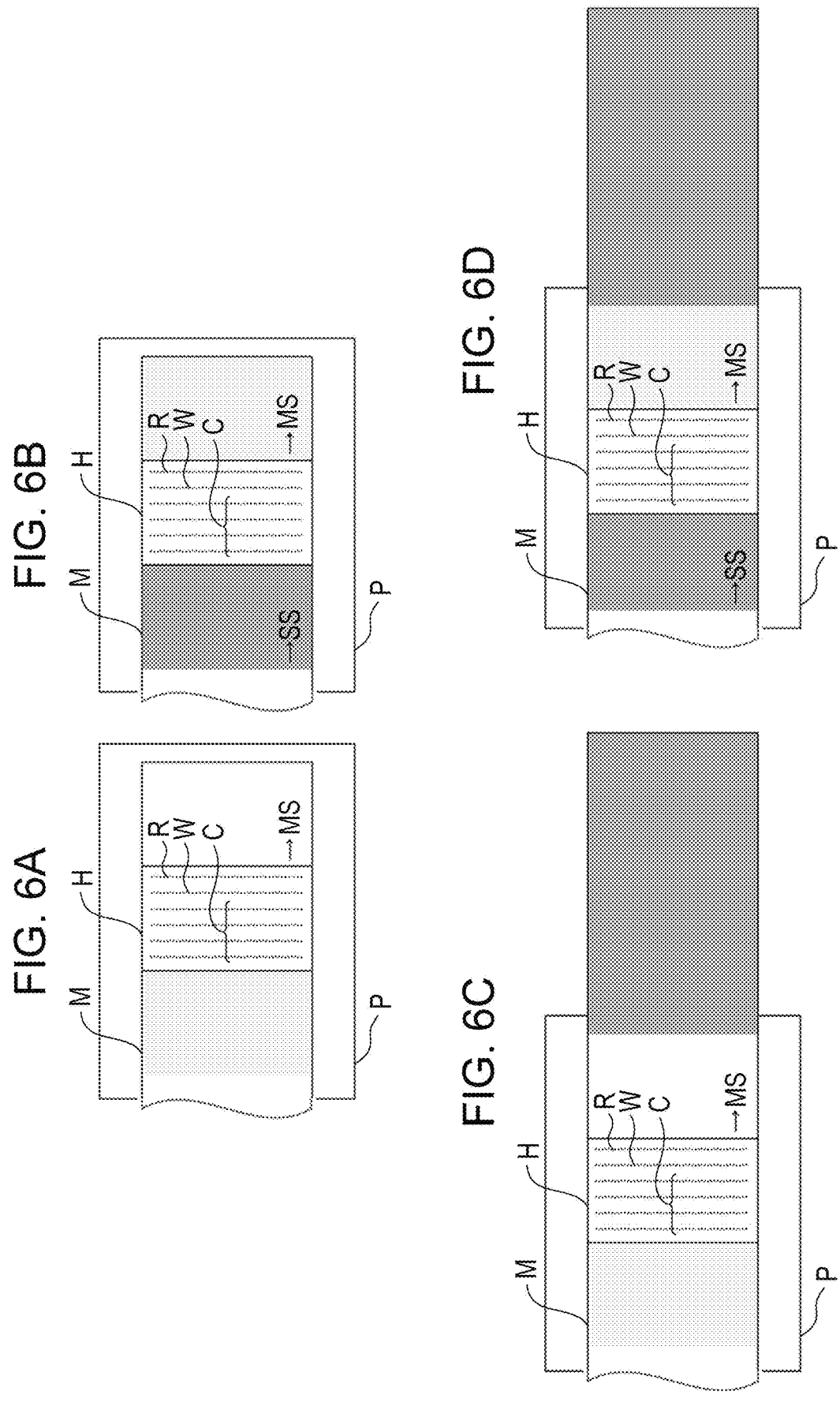

RECORDING METHOD AND RECORDING APPARATUS

The present application is based on, and claims priority from JP Application Serial Number 2023-051182, filed Mar. 28, 2023, the disclosure of which is hereby incorporated by reference herein in its entirety.

BACKGROUND

1. Technical Field

The present disclosure relates to a recording method and a recording apparatus.

2. Related Art

Ink jet recording methods can record high-definition images with a relatively simple apparatus and are rapidly developed in various fields. Among these methods, it is investigated that recording (printing) is performed on a recording medium including a film of PET or the like using an aqueous ink by a so-called serial type recording method in which recording is performed by performing scanning plural times, in which the ink is ejected and attached to the medium while the ink jet head is moved.

In particular, a film such as PET is transparent or translucent, and in order to improve the visibility of a color image, a layer formed of a white ink called a base layer that conceals the background and a layer formed of a color ink that forms a predetermined image are laminated and printed.

For example, JP-A-2018-015968 discloses an ink jet recording method in which, in a serial type recording method, each step of a step of forming an image layer using a white ink and a step of forming an image layer using a color ink is performed by performing main scanning plural times.

However, in the serial type recording method, there is a problem that the recording speed is slow.

In addition, there are also a problem that dew condensation occurs on the nozzle surface and ink ejection stability is decreased due to the dew condensation, and a problem that a white ink and a color ink are mixed or ink droplets are bled to cause deterioration in image quality (density unevenness).

Therefore, a recording method that suppresses dew condensation while providing an excellent recording speed, and provides an excellent image quality (density unevenness) is required.

SUMMARY

According to an aspect of the present disclosure is to provide a recording method including a treatment liquid attachment step of attaching a treatment liquid containing an aggregating agent to a recording medium, a white ink attachment step of ejecting a white ink composition containing a white coloring material from an ink jet head and attaching the white ink composition to the recording medium, and a non-white ink attachment step of ejecting a non-white ink composition containing a non-white coloring material from the ink jet head and attaching the non-white ink composition to the recording medium, in which the white ink composition and the non-white ink composition are aqueous inks, the white ink attachment step and the non-white ink attachment step are each performed by scanning in which the ink composition is ejected from the ink jet head and attached to the recording medium while the ink jet head is moved with respect to the recording medium in a state where a position is fixed, in the white ink attachment step, the white ink composition is attached to a scanning region of one scanning in one scanning, in the non-white ink attachment step, the non-white ink composition is attached to a scanning region of one scanning in one scanning, on the scanning region in which scanning in one of the white ink attachment step and the non-white ink attachment step is performed, scanning in another step is performed by another scanning, and in the white ink attachment step and the non-white ink attachment step, a surface temperature of the recording medium is 35° C. or lower.

According to another aspect of the present disclosure, there is provided a recording apparatus which performs recording by the recording method according to the above aspect, including the treatment liquid, the white ink composition, the non-white ink composition, and the ink jet head.

BRIEF DESCRIPTION OF THE DRAWINGS

FIG. 3 is a diagram (Table 1) showing composition examples of inks and treatment liquids.

FIGS. 4A and 4B are diagrams (Tables 2-1 and 2-2) showing examples of recording methods and evaluation results.

FIGS. 5A and 5B are diagrams (Tables 3-1 and 3-2) showing examples of recording methods and evaluation results.

FIGS. 6A to 6D are schematic views showing examples of recording according to the present embodiment performed using the recording apparatus in FIG. 1.

DESCRIPTION OF EMBODIMENTS

Figure 1:
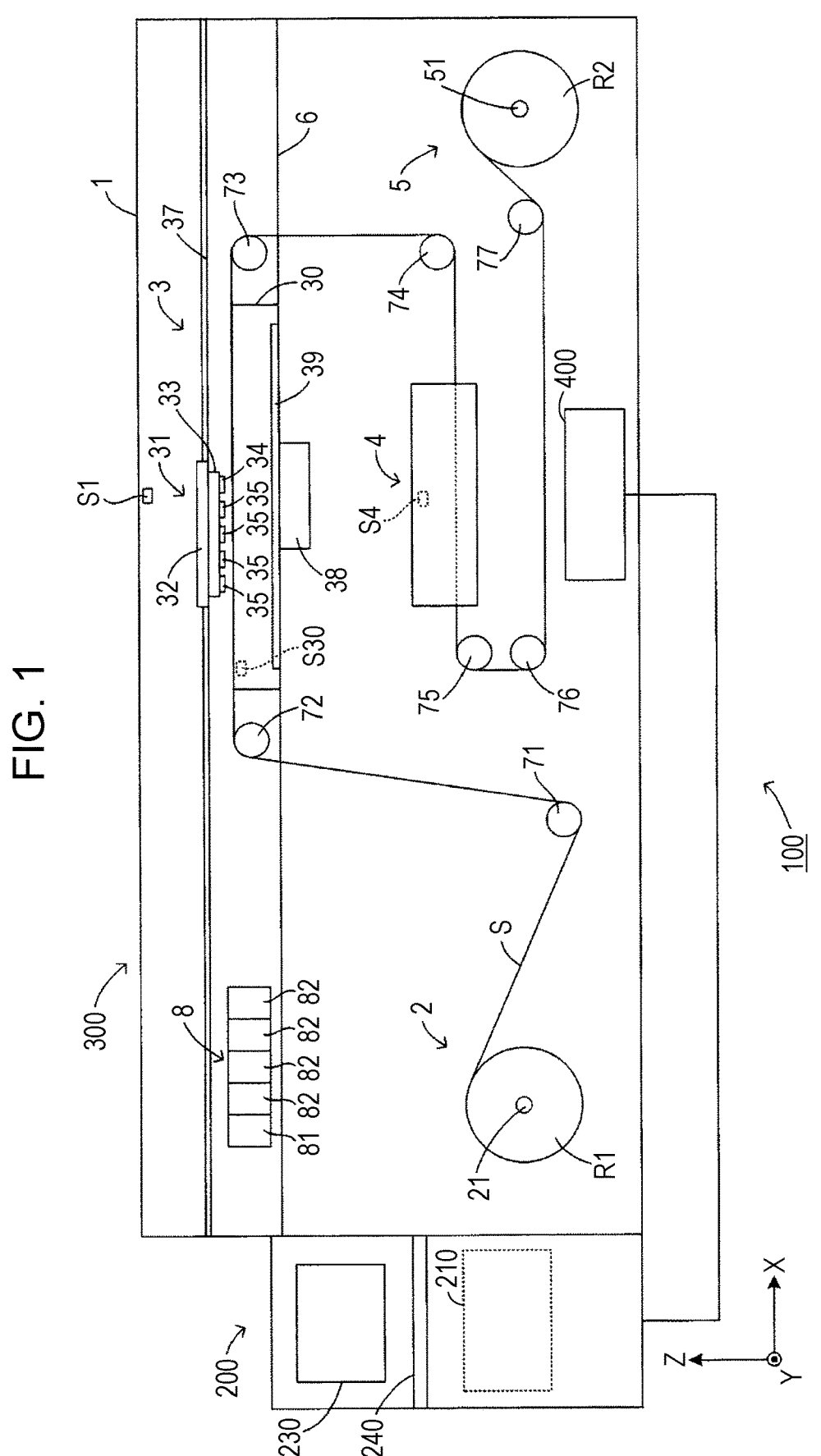
FIG. 1 is a front view schematically showing an example of a recording apparatus according to the present embodiment.

Hereinafter, embodiments of the present disclosure will be described. The embodiments described below describe examples of the present disclosure. The present disclosure is not limited to the following embodiments, and includes various modifications implemented within a range not changing the gist of the present disclosure. It should be noted that not all of the configurations described below are essential configurations of the present disclosure.

1. Recording Method

A recording method according to one embodiment of the present disclosure includes a treatment liquid attachment step of attaching a treatment liquid containing an aggregating agent to a recording medium, a white ink attachment step of ejecting a white ink composition containing a white coloring material from an ink jet head and attaching the white ink composition to the recording medium, and a non-white ink attachment step of ejecting a non-white ink composition containing a non-white coloring material from the ink jet head and attaching the non-white ink composition to the recording medium, the white ink composition and the non-white ink composition are aqueous inks, the white ink attachment step and the non-white ink attachment step are each performed by scanning in which the ink composition is ejected from the ink jet head and attached to the recording medium while the ink jet head is moved with respect to the recording medium in a state where a position is fixed, in the white ink attachment step, the white ink composition is attached to a scanning region of one scanning in one scanning, in the non-white ink attachment step, the non-white ink composition is attached to a scanning region of one scanning in one scanning, on the scanning region in which scanning in one of the white ink attachment step and the non-white ink attachment step is performed, scanning in another step is performed by another scanning, and in the white ink attachment step and the non-white ink attachment step, a surface temperature of the recording medium is 35° C. or lower.

It is investigated that recording (printing) is performed on a recording medium including a film of PET or the like using an aqueous ink by a so-called serial type recording method in which recording is performed by scanning, in which the ink is ejected and attached to the medium while the ink jet head is moved, plural times.

In particular, a film such as PET is transparent (including a case of being translucent), and in order to improve the visibility of a color image, a layer formed of a white ink called a base layer that conceals the background and a layer formed of a color ink that forms a predetermined image are laminated and printed.

Here, since the ink jet head comes to a position away from the medium between main scannings in the serial type recording method, the advantage of the serial type recording method is that the ink is flushed from the nozzle to a location other than the medium and nozzle reliability is easily secured. In addition, since the position of the medium is fixed during the main scanning, image deterioration due to transport speed variation associated with the medium transport can be prevented. Further, since a wider image can be recorded by performing a plurality of main scannings, the length of the nozzle row of the ink jet head (the width at which ink can be attached in one main scanning) can be shortened, and this method is useful.

However, in the serial type recording method, when one ink is attached to the scanning region of the medium, to which the ink can be attached in one main scanning, in a divided manner in two or more main scannings, the number of times of main scanning required for recording increases, and the recording speed decreases. Therefore, by completely attaching the ink to the scanning region of the medium, to which the ink can be attached by one main scanning, in one main scanning per ink (by not attaching one ink to the same scanning region in two or more main scannings), the recording speed is increased.

On the other hand, when a color image is formed at a position that overlaps with a white image by such recording, that is, recording is performed in which the white ink is attached to the scanning region of the medium, to which the ink can be attached by one main scanning, in one main scanning, and the color ink is attached thereto in one main scanning, there is a new problem that dew condensation occurs on the nozzle surface and ink ejection stability is decreased due to the dew condensation. It is assumed that since all of each ink is attached to the scanning region of the medium in one main scanning, the ink attachment amount in one main scanning is large, a large amount of the solvent component of the ink attached to the medium evaporates at once to increase the vapor concentration on the recording medium, and the solvent component of the evaporated ink is condensed on the nozzle surface during the main scanning for attaching the next ink.

As a result of the verification, it is found that when a primary drying step of heating a medium in the vicinity of a platen is performed, evaporation of the ink is promoted by heating, and a temperature difference between the nozzle surface and the vicinity of the platen becomes large, and thus dew condensation easily occurs. Therefore, in the steps of attaching each ink, even when the primary drying step by heating is not performed or performed, setting the medium temperature to a temperature equal to or lower than a predetermined temperature suppresses evaporation of the solvent component of the ink, and further suppresses the temperature difference between the nozzle surface and the vicinity of the platen to be small, and thus dew condensation can be reduced.

However, when the primary drying step by heating is not performed or low temperature heating is performed, ink drying is not promoted, and thus there is a new problem that the white ink and the color ink are mixed or ink droplets are bled to cause deterioration in image quality (density unevenness). In addition, when the ink is attached to the scanning region of the medium to which the ink can be attached in one main scanning, the attachment amount of the ink to be attached in one scanning is large, and deterioration in image quality due to bleeding of ink droplets or the like easily occurs.

Therefore, by using the treatment liquid including an aggregating agent for aggregating the components of the ink, the ink droplets can be fixed on the medium at an early stage, and the image quality (density unevenness) is excellent.

Therefore, according to the recording method according to the present embodiment, it is possible to provide a recording method that suppresses dew condensation while providing an excellent recording speed, and provides an excellent image quality (density unevenness).

Hereinafter, each step of the recording method according to the present embodiment will be described. Note that when the white ink composition and the non-white ink composition are not particularly distinguished, the white ink composition and the non-white ink composition are simply referred to as an ink composition or ink.

1.1 Treatment Liquid Attachment Step

The recording method according to the present embodiment includes a treatment liquid attachment step of attaching a treatment liquid containing an aggregating agent to a recording medium.

1.1.1 Attachment Form

As the method of attaching the treatment liquid to a recording medium, any one of non-contact type and contact type methods such as an ink jet method, an application method using a roller, a bar, and the like, a method of applying the treatment liquid to the recording medium using various sprays, a method of applying the treatment liquid by immersing the recording medium in the treatment liquid, and a method of applying the treatment liquid to the recording medium using a brush and the like, or a combined method thereof can be used. Among these, an ink jet method is preferable.

In the recording method according to the present embodiment, it is preferable that the treatment liquid attachment step is performed by scanning in which the treatment liquid is ejected from the ink jet head and attached to the recording medium while the ink jet head is moved. In this case, the attachment amount or attachment location of the treatment liquid is easily controlled. Further, it is preferable that in the white ink attachment step and the non-white ink attachment step described later, scanning in which the treatment liquid is attached is performed on the same scanning region by the same scanning as the scanning in which each ink composition is attached. In such an attachment form (simultaneous strike), the treatment liquid and each ink composition are easily mixed with each other and easily react with each other. In this manner, the thickening and aggregation of the ink are further promoted, the ink droplets can be fixed on the medium earlier, and the image quality (density unevenness) tends to be more excellent.

In the above-described attachment form, for example, when a plurality of nozzle rows each formed of a plurality of nozzles arrayed along a direction (hereinafter, also referred to as a "nozzle row direction") intersecting a direction in which the ink jet head is moved (hereinafter, also referred to as a "head movement direction") are provided along the head movement direction on the nozzle surface of the ink jet head, when a nozzle row that ejects the treatment liquid is projected along the head movement direction, the nozzle row that ejects the white ink composition and the nozzle row that ejects the non-white ink composition can be arranged so as to at least partially overlap each other in the nozzle row direction.

In the above-described attachment form, a timing at which the white ink composition and the treatment liquid land and a timing at which the non-white ink composition and the treatment liquid land are different in some cases, but the time difference is very small. Therefore, the order in which the ink composition and the treatment liquid land is not particularly limited. However, from the viewpoint of more excellent reactivity, the order in which the treatment liquid lands before the ink composition lands is preferable.

The maximum attachment amount range of the treatment liquid is preferably 0.1 to 5.0 mg/inch$^2$, more preferably 0.2 to 4.0 mg/inch$^2$, even more preferably 0.3 to 3.0 mg/inch$^2$, particularly preferably 0.4 to 2.0 mg/inch$^2$, more particularly preferably 0.5 to 1.5 mg/inch$^2$, and very particularly preferably 0.8 to 1.5 mg/inch$^2$ per unit area of the recording medium when the treatment liquid attachment step is performed in connection with the white ink attachment step. When the maximum attachment amount range of the treatment liquid is within the above range, there is a tendency that a more excellent image quality (density unevenness) is obtained, and a more excellent ink filling property is obtained.

Here, "performed in connection with" refers that the attachment of the treatment liquid to the recording medium by the treatment liquid attachment step is performed before or at the same time as the time when the white ink composition is attached to the recording medium by the white ink attachment step.

The maximum attachment amount range of the treatment liquid is preferably 0.01 to 3.0 mg/inch$^2$, more preferably 0.05 to 2.0 mg/inch$^2$, even more preferably 0.1 to 1.0 mg/inch$^2$, particularly preferably 0.2 to 0.8 mg/inch$^2$, and more particularly preferably 0.3 to 0.7 mg/inch$^2$ per unit area of the recording medium when the treatment liquid attachment step is performed in connection with the non-white ink attachment step. When the maximum attachment amount range of the treatment liquid is within the above range, there is a tendency that a more excellent image quality (density unevenness) is obtained, and a more excellent ink filling property is obtained.

In addition, the total maximum attachment amount range of the treatment liquid in each treatment liquid attachment step performed in connection with the white ink attachment step and the non-white ink attachment step is preferably 4.0 mg/inch$^2$ or less, and more preferably 0.1 mg/inch$^2$ or more and 3.8 mg/inch$^2$ or less. Further, the total maximum attachment amount range of the treatment liquid is more preferably 0.5 mg/inch$^2$ or more and 3.5 mg/inch$^2$ or less, even more preferably 0.8 mg/inch$^2$ or more and 2.5 mg/inch$^2$ or less, and still even more preferably 1.0 mg/inch$^2$ or more and 2.0 mg/inch$^2$ or less. When the total maximum attachment amount range of the treatment liquid is within the above range, there is a tendency that a more excellent image quality (density unevenness) is obtained, and a more excellent ink filling property is obtained.

Further, in the region to which the white ink composition and the non-white ink composition are attached, the attachment amount of the treatment liquid to be attached to the recording medium may be constant or may vary depending on the location. In particular, the attachment amount of the treatment liquid may be varied depending on the location according to the attachment amount of the non-white ink composition. However, it is preferable that the treatment liquid attachment step is performed such that even in any location (recording region) where recording is performed in the recording method, the attachment amount of the treatment liquid in the treatment liquid attachment step (hereinafter, also referred to as a "second treatment liquid attachment step") performed in connection with the non-white ink attachment step in the same recording region is smaller than the attachment amount of the treatment liquid in the treatment liquid attachment step (hereinafter, also referred to as a "first treatment liquid attachment step") performed in connection with the white ink attachment step.

For example, it is preferable that the treatment liquid attachment step is performed such that even in the recording region in which the attachment amount of the treatment liquid in the second treatment liquid attachment step is the maximum attachment amount, the attachment amount of the treatment liquid in the second treatment liquid attachment step is smaller than the attachment amount of the treatment liquid in the first treatment liquid attachment step. That is, it is preferable that the treatment liquid attachment step is performed such that even in the recording region in which the attachment amount of the treatment liquid in the second treatment liquid attachment step is the maximum attachment amount and the attachment amount of the treatment liquid in the first treatment liquid attachment step is the minimum attachment amount, in the same recording region, the attachment amount of the treatment liquid in the second treatment liquid attachment step is smaller than the attachment amount of the treatment liquid in the first treatment liquid attachment step.

A ratio (mass ratio) of the attachment amount of the treatment liquid in the second treatment liquid attachment step to the attachment amount of the treatment liquid in the first treatment liquid attachment step is preferably less than 1, more preferably 0.1 or more and 0.9 or less, even more preferably 0.2 or more and 0.5 or less, still even more preferably 0.3 or more and 0.49 or less, and particularly preferably 0.4 or more and 0.47 or less. This case is preferable since the image quality and the like are excellent.

A ratio (mass ratio) of the attachment amount of the white ink composition in the white ink attachment step to the attachment amount of the treatment liquid in the first treatment liquid attachment step is preferably 5 or more and 20 or less, more preferably 7 or more and 17 or less, and even more preferably 10 or more and 15 or less. This case is preferable since the image quality and the like are excellent.

A ratio (mass ratio) of the attachment amount of the non-white ink composition in the non-white ink attachment step to the attachment amount of the treatment liquid in the second treatment liquid attachment step is preferably 8 or more and 18 or less, more preferably 10 or more and 16 or less, and even more preferably 11 or more and 15 or less. This case is preferable since the image quality and the like are excellent.

When the liquid droplets of the treatment liquid are attached to the recording medium by applying the treatment liquid by using an ink jet method or a spray, the maximum weight range per droplet of the liquid droplets of the treatment liquid is preferably 0.5 to 8 ng, more preferably 1 to 6 ng, even more preferably 1.5 to 5 ng, and particularly preferably 2 to 4 ng. By doing so, the chance of contact between the treatment liquid and the ink on the recording medium can be increased, and there is a tendency that a more excellent image quality (density unevenness) and a more excellent ink filling property can be obtained.

1.1.2 Recording Medium

Examples of the recording medium used in the recording method according to the present embodiment include, but not particularly limited to, an absorbent recording medium such as paper and cloth, a low-absorbent recording medium such as printing paper, and a non-absorbent recording medium such as metal, glass, and polymer.

Here, the low-absorbent or non-absorbent recording medium refers to a recording medium having a property of not absorbing liquid at all or hardly absorbing liquid. Quantitatively, the low-absorbent or non-absorbent recording medium refers to a "recording medium having a water absorption amount of 10 mL/m$^2$ or less from the start of contact to 30 msec$^{1/2}$ in the Bristow method". The Bristow method is the most popular method for measuring the amount of liquid absorption in a short time and is also adopted by Japan Technical Association of the Pulp and Paper Industry (JAPAN TAPPI). The details of the test method are laid out in the standard No. 51 "JAPAN TAPPI Paper Pulp Test Method 2000 Edition" under "Paper and paperboard-Liquid absorbency test method-Bristow method". On the other hand, the absorbent recording medium refers to a recording medium that does not correspond to a low-absorbent or non-absorbent recording medium.

Examples of the low-absorbent recording medium include a recording medium having a low-absorbent coating layer provided on a surface thereof, and the low-absorbent recording medium is referred to as a coated paper. Examples of the recording medium whose base material is paper include printed paper such as art paper, coated paper, and matte paper. When the base material is a plastic film, examples thereof include recording media in which a polymer or the like is coated onto a surface such as polyvinyl chloride, polyethylene terephthalate, polycarbonate, polystyrene, polyurethane, polyethylene, and polypropylene, and recording media in which particles such as silica, titanium and the like are coated with a binder.

Examples of the non-absorbent recording medium include a medium in which plastic is coated on a base material such as paper, a medium in which a plastic film adheres to the base material such as paper, and a plastic film without an absorbing layer (receiving layer). Examples of the plastic include polyvinyl chloride, polyethylene terephthalate, polycarbonate, polystyrene, polyurethane, polyethylene, and polypropylene.

The absorbent recording medium is not particularly limited and examples thereof include plain paper, cardboard, and liner paper. Examples of liner paper include paper formed of paper such as kraft pulp, used paper, or the like.

The recording medium may be colorless transparent, translucent, colored transparent, chromatic opaque, achromatic opaque, and the like. In addition, the recording medium itself may be colored, translucent, or transparent.

1.1.3 Treatment Liquid

Hereinafter, each component contained in the treatment liquid used in the treatment liquid attachment step will be described. The treatment liquid is not an ink composition used for performing coloring on the recording medium, but an auxiliary liquid used together with the ink composition used for performing coloring. The treatment liquid may contain a coloring material such as a pigment or the like. The content thereof is preferably 0.2% by mass or less, more preferably 0.1% by mass or less, and even more preferably 0.05% by mass or less with respect to a total amount of the treatment liquid, and the lower limit is 0% by mass. The treatment liquid preferably does not contain a coloring material.

Aggregating Agent

The treatment liquid used in the recording method according to the present embodiment contains an aggregating agent for aggregating the components of the ink. The aggregating agent has an effect of aggregating the coloring material and the resin particles by reacting with the components such as the coloring material contained in the ink, the resin particles contained in the ink, and the like. However, the degree of aggregation of the coloring material and the resin particles by the aggregating agent varies depending on each type of the aggregating agent, the coloring material, and the resin particles, and can be adjusted. In addition, the aggregating agent can aggregate the coloring material and the resin particles by reacting with the coloring material and the resin particles contained in the ink. For example, such aggregation makes it possible to enhance the color development of the coloring material, to enhance the fixability of the resin particles, and/or to increase the viscosity of the ink.

The aggregating agent is not particularly limited, and examples thereof include a metal salt, an organic acid, an inorganic acid, a cationic compound, and the like, and as the cationic compound, a cationic resin (cationic polymer) and the like can be used. Among these, a polyvalent metal salt is preferable as the metal salt, and a cationic resin is preferable as the cationic compound. Therefore, as the aggregating agent, it is preferable to select any one of a cationic resin, an organic acid, and a polyvalent metal salt from the viewpoint of obtaining particularly excellent image quality, scratch resistance, gloss, and the like.

Metal Salt

The metal salt is preferably a polyvalent metal salt, but it is also possible to use metal salts other than polyvalent metal salts. Among these aggregating agents, it is preferable to use at least one selected from a metal salt and an organic acid from the viewpoint of excellent reactivity with components included in the ink. In addition, among the cationic compounds, cationic resins are preferably used from the viewpoint of easy dissolution in the treatment liquid. In addition, a plurality of types of aggregating agents can be used in combination.

The polyvalent metal salt is a compound formed of a divalent or higher metal ion and an anion. Examples of the divalent or higher metal ion include ions such as calcium, magnesium, copper, nickel, zinc, barium, aluminum, titanium, strontium, chromium, cobalt, iron, and the like. Among the metal ions constituting these polyvalent metal salts, the metal ion is preferably at least one of calcium ion and magnesium ion from the viewpoint of an excellent aggregating property of the components of the ink.

The anion constituting the polyvalent metal salt is an inorganic ion or an organic ion. That is, the polyvalent metal salt in the present disclosure is formed of an inorganic ion or an organic ion and a polyvalent metal. Examples of the inorganic ion include a chloride ion, a bromine ion, an iodine ion, a nitrate ion, a sulfate ion, and a hydroxide ion. Examples of the organic ion include an organic acid ion, and examples thereof include a carboxylic acid ion, a formic acid ion, and the like.

The polyvalent metal compound is preferably an ionic polyvalent metal salt, and in particular, when the polyvalent metal salt is a magnesium salt or a calcium salt, the stability of the treatment liquid is further improved. In addition, as the counter ion of the polyvalent metal, any of an inorganic acid ion and an organic acid ion may be used.

Specific examples of the polyvalent metal salt include a calcium carbonate such as a heavy calcium carbonate and a light calcium carbonate, calcium nitrate, calcium chloride, calcium sulfate, magnesium sulfate, calcium hydroxide, magnesium chloride, magnesium carbonate, barium sulfate, chloride barium, zinc carbonate, zinc sulfide, aluminum silicate, calcium silicate, magnesium silicate, copper nitrate, calcium formate, calcium acetate, magnesium acetate, and aluminum acetate. These polyvalent metal salts may be used alone, or may be used in combination of two or more thereof. Among these, since sufficient solubility in water can be secured and the use thereof reduces traces of the treatment liquid (makes traces less visible), at least any one of calcium formate, magnesium sulfate, calcium nitrate, and calcium chloride is preferable, and calcium formate or calcium nitrate is more preferable. In addition, these metal salts may have hydration water in the form of a raw material.

Examples of the metal salt other than the polyvalent metal salt include monovalent metal salts such as sodium salt and potassium salt, and for example, there are mentioned sodium sulfate, potassium sulfate, and the like.

Organic Acid

Preferable examples of the organic acid include poly (meth)acrylic acid, acetic acid, glycolic acid, malonic acid, malic acid, maleic acid, ascorbic acid, succinic acid, glutaric acid, fumaric acid, citric acid, tartaric acid, lactic acid, sulfonic acid, orthophosphoric acid, pyrrolidonecarboxylic acid, pyrone carboxylic acid, pyrrole carboxylic acid, furancarboxylic acid, pyridine carboxylic acid, coumaric acid, thiophene carboxylic acid, nicotinic acid, derivatives of these compounds, and salts thereof. The organic acid may be used alone or in combination of two or more thereof. Metal salts which are salts of organic acids are included in the metal salts described above.

Inorganic Acid

Examples of the inorganic acid include sulfuric acid, hydrochloric acid, nitric acid, phosphoric acid, and the like. The inorganic acid may be used alone or in combination of two or more thereof.

Cationic Resin

Examples of cationic resins (cationic polymers) include cationic urethane-based resin, cationic olefin-based resin, cationic amine-based resin, and the like. The cationic polymer is preferably water-soluble.

Commercially available products can be used as the cationic urethane-based resin, and for example, HYDRAN CP-7010, CP-7020, CP-7030, CP-7040, CP-7050, CP-7060, and CP-7610 (trade names, manufactured by DIC Corporation), SUPERFLEX 600, 610, 620, 630, 640, and 650 (trade name, manufactured by DKS Co., Ltd.), urethane emulsion WBR-2120C and WBR-2122C (trade names, manufactured by Taisei Fine Chemical Co., Ltd.), and the like can be used.

The cationic olefin resin is a resin having an olefin such as ethylene and propylene in the structural skeleton, and known ones can be appropriately selected and used. In addition, the cationic olefin resin may be in an emulsion state of being dispersed in a solvent containing water, an organic solvent, or the like. As the cationic olefin resin, a commercially available product can be used, and examples thereof include arrow base CB-1200 and CD-1200 (trade name, manufactured by Unitika Ltd.).

As the cationic amine-based resin (cationic polymer), any resin having an amino group in the structure may be used, and known ones can be appropriately selected and used. Examples thereof include polyamine resin, polyamide resin, polyallylamine resin, and the like. Polyamine resin is a resin having an amino group in the main skeleton of the resin. Polyamide resin is a resin having an amide group in the main skeleton of the resin.

Polyallylamine resin is a resin having a structure derived from an allyl group in the main skeleton of the resin.

In addition, as the cationic polyamine resin, Unisense KHE103L (hexamethylenediamine/epichlorohydrin resin, 1% aqueous solution of a pH of substantially 5.0, viscosity: 20 to 50 (mPa·s), an aqueous solution with a solid content concentration of 50% by mass) manufactured by Senka Co., Ltd., Unisense KHE104L (dimethylamine/epichlorohydrin resin, 1% aqueous solution of a pH of substantially 7.0, viscosity: 1 to 10 (mPa·s), an aqueous solution with a solid content concentration of 20% by mass), and the like can be used. In addition, specific examples of commercially available products of cationic polyamine-based resin include FL-14 (manufactured by SNF), Arafix 100, 251S, 255, 255LOX (manufactured by Arakawa Chemical Co., Ltd.), DK-6810, 6853, 6885; WS-4010, 4011, 4020, 4024, 4027, 4030 (manufactured by Seiko PMC), Papiogen P-105 (manufactured by Senka), Sumire's Resin 650 (30), 675A, 6615, SLX-1 (manufactured by Taoka Chemical Industry Co., Ltd.), Kachio Master (registered trademark) PD-1, 7 (epichlorohydrin-amine derivative resin), 30, A, PDT-2, PE-10, PE-30, DT-EH, EPA-SK01, TMHMDA-E (manufactured by Yokkaichi Chemical Co., Ltd.), Jetfix 36N, 38A, 5052 (manufactured by Satoda Kako Co., Ltd.), and the like.

Examples of the polyamine-based resin include a polyallylamine resin. Examples of the polyallylamine resin include polyallylamine hydrochloride, polyallylamineamide sulfate, allylamine hydrochloride/diallylamine hydrochloride copolymers, allylamine acetate/diallylamine acetate copolymers, allylamine acetate/diallylamine acetate copolymers, allylamine hydrochloride/dimethylallylamine hydrochloride copolymers, allylamine/dimethylallylamine copolymers, polydiallylamine hydrochloride, polymethyldiallylamine hydrochloride, polymethyldiallylamineamide sulfate, polymethyldiallylamine acetate, polydiallyldimethylammonium chloride, diallylamine acetate/sulfur dioxide copolymers, diallylmethylethylammonium ethylsulfate/sulfur dioxide copolymers, methyldiallylamine hydrochloride/sulfur dioxide copolymers, diallyldimethylammonium chloride/sulfur dioxide copolymers, and diallyldimethylammonium chloride/acrylamide copolymers.

A plurality of types of these aggregating agents may be used. In addition, when at least one of a polyvalent metal salt, an organic acid, and a cationic resin is selected among these aggregating agents, the aggregation action is more favorable, and thus an image with higher quality (particularly good color developing property) can be formed.

The total content of the aggregating agent in the treatment liquid is preferably, for example, 1% by mass or more and 30% by mass or less with respect to the total mass of the treatment liquid. The lower limit of the content is preferably 2% by mass or more, and more preferably 3% by mass or more. In addition, the upper limit of the content is preferably 20% by mass or less, more preferably 15% by mass or less, even more preferably 12% by mass or less, still even more preferably 10% by mass or less, and particularly preferably 8% by mass or less.

Even when the aggregating agent is common to both the solution and the dispersion, the content of the solid content is preferably within the above range. When the content of the aggregating agent is 1% by mass or more, the aggregating agent tends to be able to have a sufficient ability to aggregate the components contained in the ink. In addition, when the content of the aggregating agent is 30% by mass or less, the solubility and dispersibility of the aggregating agent in the treatment liquid are further improved, and the storage stability of the treatment liquid or the like tends to be able to be improved.

Even when the organic solvent that can be included in the treatment liquid has high hydrophobicity, from the viewpoint of good solubility of the aggregating agent in the treatment liquid, it is preferable to use an aggregating agent in which the solubility in 100 g of water at 25° C. is 1 g or more, and more preferable to use an aggregating agent in which the solubility is 3 g or more and 80 g or less.

Water

The treatment liquid used in the recording method according to the present embodiment preferably contains water. The type, content, and the like of water can be the same as those for the white ink composition described later. An aqueous treatment liquid is preferable.

Organic Solvent

The treatment liquid used in the recording method according to the present embodiment preferably contains an organic solvent. The type, content, and the like of the organic solvent can be the same as those for the white ink composition described later.

The treatment liquid does not contain an organic solvent of alkane polyols having a normal boiling point of higher than 280° C. in an amount of preferably more than 2% by mass, more preferably more than 1.5% by mass, even more preferably more than 1.0% by mass, still even more preferably more than 0.5% by mass, and particularly preferably more than 0.1% by mass with respect to the total mass of the treatment liquid. The lower limit of the content of the organic solvent of the alkane polyols having a normal boiling point of higher than 280° C. may be 0% by mass.

The treatment liquid preferably contains an organic solvent having a normal boiling point of 150° C. to 280° C. The normal boiling point of the organic solvent is more preferably 160° C. to 270° C., even more preferably 170° C. to 260° C., and particularly preferably 180° C. to 250° C. In addition, the content of the organic solvent is preferably 10% to 50% by mass, more preferably 20% to 40% by mass, and even more preferably 25% to 35% by mass with respect to the total mass of the treatment liquid.

By doing so, the formed image is satisfactorily dried, recording can be performed faster, and there is a tendency that the adhesion to the recording medium can be improved. Further, it is more preferable that the treatment liquid contains an organic solvent (not limited to polyols) having a normal boiling point of higher than 280.0° C. within the above range. Examples of the organic solvent having a normal boiling point of higher than 280° C. include glycerin, polyethylene glycol monomethyl ether, and the like.

Surfactant

The treatment liquid used in the recording method according to the present embodiment preferably contains a surfactant. The types, content, and the like of the surfactant can be the same as those for the white ink composition described later.

Other Components

The treatment liquid used in the recording method according to the present embodiment may contain components such as resin particles, a wax, an additive, a resin dispersant, a preservative, a fungicide, a rust inhibitor, a chelating agent, a viscosity adjusting agent, an antioxidant, and the like, in addition to the above-described components, as long as the function is not impaired. These components can be the same as those for the white ink composition described later.

Physical Properties of Treatment Liquid

From the viewpoint of making the wet spreadability to the recording medium appropriate, the surface tension of the treatment liquid used in the recording method according to the present embodiment at 25° C. is preferably 40 mN/m or less, more preferably 38 mN/m or less, even more preferably 35 mN/m or less, still even more preferably 30 mN/m or less, and particularly preferably 25 mN/m or less. The surface tension can be measured by confirming the surface tension when a platinum plate is wetted with the composition in an environment of 25° C. using, for example, an automatic surface tensiometer CBVP-Z (manufactured by Kyowa Interface Science, Co., Ltd.).

The treatment liquid used in the recording method according to the present embodiment is more preferably attached to the recording medium by an ink jet method. In such a case, the viscosity at 20° C. is preferably 1.5 mPa·s or more and 15 mPa·s or less, more preferably 1.5 mPa·s or more and 7 mPa·s or less, and even more preferably 1.5 mPa·s or more and 5.5 mPa·s or less. When the treatment liquid is attached to the recording medium by an ink jet method, it is easy to efficiently form a predetermined treatment liquid attachment region in a recording medium. The viscosity can be measured, for example, under the conditions of 25° C. and a shear rate of 200 s⁻¹ with a rheometer MCR302, manufactured by Anton Paar).

1.2 White Ink Attachment Step

The recording method according to the present embodiment includes a white ink attachment step of ejecting a white ink composition containing a white coloring material from an ink jet head and attaching the white ink composition to a recording medium.

1.2.1 Attachment Form

The white ink attachment step of the recording method according to the present embodiment is performed by scanning in which a white ink composition is ejected from the ink jet head and attached to the recording medium while the ink jet head is moved with respect to the recording medium in a state where the position is fixed (hereinafter, also referred to as "main scanning").

For example, in a recording apparatus 100 shown in FIG. 1 described later, such scanning is performed by ejecting the white ink composition to a surface of a sheet S from a nozzle N of an ink jet head 35 while moving a carriage 32 in a direction parallel to an X-axis direction with respect to the sheet S stopped on an upper surface of a platen 30. The position of the sheet S may be moved by transporting the sheet S or the like during the time when the ink jet head does not perform scanning, but the position of the sheet S is fixed since the position of the sheet S does not move during scanning. The fact that the position is fixed means that the position does not move in this manner.

The recording medium whose position is fixed may be further sucked on the platen or gripped by a roller or the like to prevent floating or the like.

In addition, the white ink attachment step of the recording method according to the present embodiment is a step of attaching the white ink composition to the scanning region of one scanning in one scanning. In the serial type recording method, one ink can be attached to the scanning region of the medium, to which the ink can be attached in one main scanning, in a divided manner in two or more main scannings. However, in this case, the number of times of main scanning required for recording increases, and the recording speed decreases. On the other hand, in the white ink attachment step of the recording method according to the present embodiment, the white ink composition is completely attached to the scanning region of the medium, to which the white ink composition can be attached in one main scanning, in one main scanning (the white ink composition is not attached to the same scanning region in two or more main scannings) to increase the recording speed. Here, the scanning region of one scanning is a region on the recording medium in which the ink jet head moves when the ink jet head performs scanning once. The scanning region is a rectangular region whose longitudinal length is the length of the ink jet head and the lateral length is the scanning distance. The length of the ink jet head is the length of the nozzle row of the ink jet head.

On the scanning region of one scanning, the scanning of the white ink attachment step is performed only once, and the scanning of the non-white ink attachment step is also performed only once.

When one ink is attached in a divided manner by two or more main scannings, the vapor concentration on the recording medium is low, and the vapor is diffused during two or more main scannings. Thus, dew condensation is less likely to occur on the nozzle surface. Further, in a so-called line type recording method in which an ink attachment step is performed while transporting a recording medium, ink is attached in one scanning. However, in the line type recording method, the recording medium is continuously transported without being stopped, and the ink attached portion immediately moves downstream of the ink jet head. Thus, vapor does not remain in the vicinity of the ink jet head and dew condensation is less likely to occur.

In the recording method according to the present embodiment, a distance at which the ink jet head moves while facing the recording medium in one scanning in the white ink attachment step and the non-white ink attachment step described later is preferably 0.3 m or more, more preferably 0.5 m or more, even more preferably 1.0 m or more, still even more preferably 1.5 m or more, and particularly preferably 2.0 m or more. When the distance is equal to or more than the above range, wide recorded matter can be recorded, and this case is useful.

On the other hand, as the distance of the main scanning increases, the nozzle surface is more likely to be exposed to vapor, and thus dew condensation more easily occurs on the nozzle surface. According to the recording method according to the present embodiment, even when the distance is particularly 0.5 m or more, the nozzle surface is likely to be exposed to vapor, and dew condensation more easily occurs, there is a tendency that dew condensation can be satisfactorily suppressed.

On the other hand, the upper limit of the distance is preferably 7.0 m or less, more preferably 5.0 m or less, even more preferably 4.0 m or less, and still even more preferably 3.0 m or less. Further, the upper limit of the distance is preferably 2.0 m or less, more preferably 1.8 m or less is preferable, and even more preferably 1.0 m or less. When the upper limit of the distance is equal to or less than the above range, the reduction of dew condensation is more excellent, and this case is preferable.

Further, the "distance at which the ink jet head moves while facing the recording medium in one scanning" refers to a distance when scanning is performed from an end to an end (from one end to the other end) of the recording medium in one scanning. Alternatively, the "distance at which the ink jet head moves to face the recording medium in one scanning" refers to a distance when scanning is performed from an end to an end (from one end to the other end) of the maximum recordable region of the recording medium in one scanning.

The step order of the white ink attachment step and the non-white ink attachment step described later is not particularly limited, and the white ink attachment step may be first performed and then the non-white ink attachment step may be performed, or the non-white ink attachment step may be first performed and then the white ink attachment step may be performed. Printing in the former order (blank front printing) is suitable when the printed matter is viewed from the side where the image is printed. In addition, printing in the latter order (blank back printing) is suitable when the printed matter is viewed from the back side of the recording medium (particularly, a transparent film or the like). The dew condensation on the nozzle surface is a problem that occurs regardless of the step order.

In the recording method according to the present embodiment, on the scanning region in which scanning in one of the white ink attachment step and the non-white ink attachment step described later is performed, scanning in the other step is performed by another scanning. In such an aspect, the subsequent ink composition can be attached by the scanning in the other step while overlapping the previous ink composition attached by the scanning in the one step. With this, a layer formed of a white ink, which is referred to as a base layer that conceals the background, and a layer formed of s color ink that forms a predetermined image can be laminated and printed, and thus even when the recording medium is transparent, the visibility of a color image can be improved.

In the recording method according to the present embodiment, the maximum attachment amount range of the ink composition in a step first performed out of the white ink attachment step and the non-white ink attachment step described later is preferably 5 $mg/inch^2$ or more, more preferably 8 $mg/inch^2$ or more, even more preferably 10 $mg/inch^2$ or more, still even more preferably 12 $mg/inch^2$ or more, and particularly preferably 14 $mg/inch^2$ or more. In this case, the color developing property of the image with the ink is particularly excellent, and this case is preferable.

The upper limit of the maximum attachment amount range is not particularly limited, and is preferably 25 mg/inch$^2$ or less, more preferably 23 mg/inch$^2$ or less, even more preferably 20 mg/inch$^2$ or less, and particularly preferably 18 mg/inch$^2$ or less. In addition, regardless of the step order, the maximum attachment amount range of the white ink composition in the white ink attachment step is also preferably set to the above range. In addition, the maximum attachment amount range of the ink composition in the step performed later out of the white ink attachment step and the non-white ink attachment step may be the above range.

It is presumed that the dew condensation occurs on the nozzle surface since a large amount of the solvent component of the ink attached to the recording medium in the first performed step evaporates at once to increase the vapor concentration on the recording medium or due to the influence of the evaporated solvent component of the previous ink during the main scanning for attaching the next ink. According to the recording method according to the present embodiment, even when the maximum attachment amount range is particularly 8 mg/inch$^2$ or more and the vapor concentration is further increased and dew condensation easily occurs, there is a tendency that dew condensation can be satisfactorily suppressed.

The maximum attachment amount range of the ink composition in a step performed later out of the white ink attachment step and the non-white ink attachment step described later is preferably smaller than the maximum attachment amount range of the ink composition in the step first performed, more preferably 1 mg/inch$^2$ or more, even more preferably 5 mg/inch$^2$ or more, still even more preferably 8 mg/inch$^2$ or more, and particularly preferably 11 mg/inch$^2$ or more.

In the recording method according to the present embodiment, in the white ink attachment step and the non-white ink attachment step described later, the maximum weight range per droplet of the liquid droplets of each of the white ink composition and the non-white ink composition is preferably 0.5 to 20 ng, more preferably 0.5 to 15 ng, even more preferably 1 to 15 ng, still even more preferably 3 to 15 ng, still yet even more preferably 5 to 15 ng, and particularly preferably 6 to 13 ng. When the maximum weight range per droplet of the liquid droplets of each ink composition is the above range, due to the relatively small size of the liquid droplet, the ink composition easily evaporates and dew condensation more easily occurs. However, according to the recording method according to the present embodiment, there is a tendency that dew condensation can be satisfactorily suppressed even in this case.

From the same viewpoint, the maximum weight range per droplet of the liquid droplets of the white ink composition in the white ink attachment step is preferably 5 to 20 ng, more preferably 7 to 18 ng, even more preferably 9 to 16 ng, and particularly preferably 10 to 15 ng.

In addition, the maximum weight range per droplet of the liquid droplets of the ink composition in the step first performed out of the white ink attachment step and the non-white ink attachment step described later may be the above range. Due to the vapor generated from the ink composition in the attachment step first performed, there is a tendency that dew condensation occurs in the attachment step performed later. When the maximum weight range per droplet of the liquid droplets of the ink composition in the step first performed is set to the above range, the recording method of the present embodiment is particularly useful.

In addition, in general, when the maximum weight range per droplet of the liquid droplets of the ink is small, the ink droplet density per recording unit area increases, and thus the recording resolution increases. Further, the recording resolution is proportional to the nozzle density. That is, when the ink attachment amount is the same, the higher the nozzle density, the more easily the dew condensation occurs.

Accordingly, from the viewpoint of being able to further enjoy the effect of the present disclosure that can satisfactorily suppress dew condensation, the nozzle density of the ink jet head used in the recording method according to the present embodiment is preferably 600 dpi or more, more preferably 800 dpi or more, even more preferably 1,000 dpi or more, and still even more preferably 1,200 dpi or more. The upper limit of the nozzle density is preferably 2400 dpi or less, more preferably 2,000 dpi or less, and even more preferably 1,600 dpi or less.

The recording resolution is preferably 600×600 dpi or more, more preferably 800×800 dpi or more, even more preferably 1,000×1,000 dpi or more, and particularly preferably 1,200×1,200 dpi or more.

In the recording method according to the present embodiment, the surface temperature of the recording medium in the white ink attachment step and the non-white ink attachment step described later is 35° C. or lower. When recording is performed in which a white ink or a color ink is attached by one main scanning in the scanning region of the medium to which the ink can be attached by one main scanning, there is a problem that dew condensation occurs on the nozzle surface and ink ejection stability is decreased due to the dew condensation. Therefore, in the steps of attaching each ink, setting the medium temperature to a temperature equal to or lower than a predetermined temperature suppresses evaporation of the solvent component of the ink, and further suppresses the temperature difference between the nozzle surface and the vicinity of the platen to be small, and thus dew condensation can be reduced.

In the white ink attachment step and the non-white ink attachment step described later, the surface temperature of the recording medium is 35° C. or lower, but preferably 33° C. or lower, more preferably 31° C. or lower, even more preferably 29° C. or lower, and particularly preferably 27° C. or lower. The lower limit of the surface temperature is not particularly limited, and is preferably 5° C. or higher, and more preferably 10° C. or higher. The lower limit of the surface temperature is further preferably 15° C. or higher, and particularly preferably 20° C. or higher. When the surface temperature is equal to or lower than the above range, dew condensation can be further reduced, and this case is preferable. Further, when the surface temperature is equal to or higher than the above range, the image quality and the like are more excellent, and this case is preferable.

Here, the temperature is a surface temperature of the portion of the recording surface of the recording medium, on which liquid attachment is applied in the attachment step, and is the highest temperature of the attachment step in the recording region.

In the white ink attachment step and the non-white ink attachment step, primary heating step may or may not be performed. The primary heating step is a step of heating the recording medium by a primary heating mechanism at a location where the ink composition is attached in the white ink attachment step and the non-white ink attachment step. The primary heating mechanism is a heating mechanism for heating the recording medium provided in a member that supports the recording medium, a heating mechanism for heating the recording medium from above, and the like at the location where the ink composition is attached.

Even when the primary heating step is performed, the surface temperature of the recording medium in the white ink attachment step and the non-white ink attachment step is set to 35° C. or lower.

In addition, even when the primary heating step is not performed, and even when in which the recording medium is heated by heat generation of a member or the like of the recording apparatus other than the primary heating mechanism, at the location where the ink composition is attached, the surface temperature is set to 35° C. or lower.

1.2.2. White Ink Composition

Hereinafter, each component contained in the white ink composition used in the white ink attachment step will be described.

White Coloring Material

The white ink composition used in the recording method according to the present embodiment contains a white coloring material. Examples of the white coloring material include metal compounds such as metal oxides, barium sulfate, and calcium carbonate. Examples of the metal oxides include titanium dioxide, zinc oxide, silica, alumina, and magnesium oxide. In addition, particles having a hollow structure may be used as the white coloring material, and as the particles having a hollow structure, known particles can be used.

As the white coloring material, titanium dioxide is preferably used from a viewpoint of good whiteness and scratch resistance among those as exemplified above. The white coloring materials may be used alone or in combination of two or more thereof.

A volume-based average particle diameter (D50), (also referred to as "volume average particle diameter") of the white coloring material is preferably 30.0 nm or more and 600.0 nm or less, more preferably 100.0 nm or more and 500.0 nm or less, and even more preferably 150.0 nm or more and 400.0 nm or less. When the volume average particle diameter of the white coloring material is within the above range, the particles are less likely to be settled, the dispersion stability can be improved, and when applied to an ink jet recording apparatus, nozzle clogging and the like can be made less likely to occur. Further, when the volume average particle diameter of the white coloring material is within the above range, it can sufficiently contribute to improving the visibility of the image.

The volume average particle diameter of the white coloring material can be measured by a particle size distribution measurement apparatus. Examples of the particle size distribution measurement apparatus include a particle size distribution meter (for example, "NANOTRAC series" manufactured by MicrotracBEL Corp.) using a dynamic light scattering method as a measuring principle. The volume average particle diameter referred as the D50 value.

In the present specification, the term "white" when referring to the white ink composition, the white coloring material, and the like does not mean only complete white, but as long as the color is in a range of being visually recognizable as white, the white includes color that is colored with chromatic color or achromatic color, or color having glossiness. In addition, the term includes an ink and a pigment called and sold with names which suggest a white ink and white pigment.

More quantitatively, the "white" in a recorded matter includes not only a color in which $L^*$ is 100, but also a color in which $L^*$ is 60 or more and 100 or less and $a^*$ and $b^*$ each are ±10 or less, in CIELAB, for example.

More specifically, for example, the white ink composition preferably falls within the above range when the lightness ($L^*$) and chromaticity ($a^*$, $b^*$) of the recording portion of the recorded matter are measured using a CIELAB-compliant spectrophotometer when recording is performed in such an amount that the surface of the recording medium formed of a transparent film is sufficiently covered with the ink. The recorded matter recorded in a sufficiently covered amount is, for example, an attachment amount of 15 mg/inch$^2$. More preferably, $80 \leq L^* \leq 100$, $-4.5 \leq a^* \leq 2$, and $-10 \leq b^* \leq 2.5$. Examples of the recording medium formed of a transparent film include LAG Jet E-1000ZC (manufactured by LINTEC Corporation). Examples of the CIELAB-compliant spectrophotometer include Spectrolino (trade name, manufactured by GretagMacbeth), where the measurement conditions are set as D50 light source, 2° observation field, DIN NB density, Abs white standard, No filter, and Reflectance measurement mode.

Typical examples of white coloring material include titanium dioxide, such as TIPAQUE CR-50-2, CR-57, CR-58-2, CR-60-2, CR-60-3, CR-Super-70, CR-90-2, CR-95, CR 953, PC-3, PF-690, PF-691, PF-699, PF-711, PF-728, PF-736, PF-737, PF-739, PF-740, PF-742, R-980, and UT-771 (all manufactured by ISHIHARA SANGYO KAISHA, LTD.).

The content (solid content) of the white coloring material in the white ink composition is preferably 0.5% by mass or more and 20.0% by mass or less, more preferably 1.0% by mass or more and 20.0% by mass or less, even more preferably 3.0% by mass or more and 15.0% by mass or less, and still even more preferably 7.0% by mass or more and 12.0% by mass or less with respect to the total mass of the white ink composition. When the content of the white coloring material is within the above range, an image with sufficient visibility can be obtained.

In the recording method according to the present embodiment, the white coloring material has a function of concealing the background of an image and enhancing the visibility of the obtained image. The content of the white coloring material in the white ink composition can be made smaller when the white coloring material is used for the purpose of enhancing the visibility of the image, compared with a case where the purpose is to conceal the background. Therefore, when the white ink composition is used for the purpose of enhancing the visibility of the image, sufficient image visibility can be obtained, the dispersion stability of the white coloring material can be easily improved and the white coloring material can be made less likely to be settled. From this point of view, the upper limit of the content of the white coloring material in the white ink composition is preferably within the above range, and preferably 10.0% by mass or less.

It is preferable that the white coloring material can be stably dispersed in the dispersion medium, and therefore, a dispersant may be used to disperse the white coloring material. Examples of the dispersant include a resin dispersant, and the dispersant is selected from those that can improve dispersion stability of the white coloring material in the white ink composition containing the white coloring material. In addition, the white coloring material may be used as a self-dispersion type pigment by modifying a surface of a pigment particle by oxidizing or sulfonating the surface of the pigment with, for example, ozone, hypochlorous acid, fuming sulfuric acid, or the like.

Examples of the resin dispersant (dispersant resin) include (meth)acrylic resins such as poly(meth)acrylic acid, (meth)acrylic acid-acrylonitrile copolymers, (meth)acrylic acid-(meth)acrylic acid ester copolymers, vinyl acetate-(meth)acrylic acid ester copolymers, vinyl acetate-(meth)acrylic acid copolymers, and vinyl naphthalene-(meth)acrylic acid copolymers, and salts thereof; styrene-based resins such as styrene-(meth)acrylic acid copolymers, styrene-(meth) acrylic acid-(meth)acrylic acid ester copolymers, styrene-α-methylstyrene-(meth)acrylic acid copolymers, styrene-α-methylstyrene-(meth)acrylic acid-(meth)acrylic acid ester copolymers, styrene-maleic acid copolymers, and styrene-maleic acid anhydride copolymers, and salts thereof; urethane-based resins, which are polymer compounds (resins) having a urethane bond formed when an isocyanate group reacts with a hydroxyl group, and which may be linear and/or branched regardless of a crosslinked structure, and salts thereof; polyvinyl alcohols; vinyl naphthalene-maleic acid copolymers and salts thereof; vinyl acetate-maleic acid ester copolymers and salts thereof; and water-soluble resins such as vinyl acetate-crotonic acid copolymers and salts thereof. Among these, a copolymer of a monomer having a hydrophobic functional group and a monomer having a hydrophilic functional group, and a polymer formed of monomers having both a hydrophobic functional group and a hydrophilic functional group are preferable. As the form of the copolymer, any form of a random copolymer, a block copolymer, an alternating copolymer, and a graft copolymer can be used.

Examples of commercially available products of the styrene-based resin dispersant include X-200, X-1, X-205, X-220, and X-228 (manufactured by SEIKO PMC COR-PORATION), NOPCOSPERSE (registered trademark) 6100 and 6110 (manufactured by SAN NOPCO LIMITED), JON-CRYL 67, 586, 611, 678, 680, 682, and 819 (manufactured by BASF SE), DISPER BYK-190 (manufactured by BYK Japan KK.), and N-EA137, N-EA157, N-EA167, N-EA177, N-EA197D, N-EA207D, and E-EN10 (manufactured by DKS Co., Ltd.).

In addition, examples of commercially available products of the acrylic resin dispersants include BYK-187, BYK-190, BYK-191, BYK-194N, and BYK-199 (manufactured by BYK Japan KK.), and Aron A-210, A6114, AS-1100, AS-1800, A-30SL, A-7250, and CL-2 (manufactured by TOAGOSEI CO., LTD.).

Further, examples of commercially available products of the urethane-based resin dispersant include BYK-182, BYK-183, BYK-184, and BYK-185 (manufactured by BYK Japan KK.), TEGO Dispers 710 (manufactured by Evonik Tego Chemi GmbH), and Borchi (registered trademark) Gen 1350 (manufactured by OMG Borchers GmbH).

These dispersants may be used alone or in combination of two or more thereof. The total content of the dispersant is preferably 0.2 parts by mass or more and 60 parts by mass or less, more preferably 1 part by mass or more and 50 parts by mass or less, even more preferably 5 parts by mass or more and 55 parts by mass or less, still even more preferably 10 parts by mass or more and 50 parts by mass or less, and particularly preferably 20 parts by mass or more and 40 parts by mass or less with respect to 100 parts by mass of the white coloring material. When the content of the dispersant is 0.2 parts by mass or more with respect to 100 parts by mass of the white coloring material, the dispersion stability of the white coloring material can be further improved. In addition, when the content of the dispersant is 60 parts by mass or less with respect to 100 parts by mass of the white coloring material, the viscosity of the obtained dispersion can be suppressed to be small.

Among the dispersants exemplified above, it is more preferable that the dispersant is at least one selected from anionic dispersant resins. In addition, in this case, it is more preferable that a weight average molecular weight of the dispersant is 500 or more. Further, the weight average molecular weight is preferably 5,000 or more and 100,000 or less, and more preferably 10,000 or more and 50,000 or less.

By using such a resin dispersant as the dispersant, the dispersion and aggregating property of the white pigment are further improved, and an image having more favorable dispersion stability and more favorable image quality can be obtained. Further, the thickening ratio of the white ink composition described later is preferably easily set to 5 times or more.

The anionic dispersant resin is a resin in which the resin has an anionic functional group and exhibits anionic properties. Examples of the anionic functional group include a carboxyl group, a sulfo group, and a phosphoric acid group. Among these groups, a carboxyl group is more preferable.

The dispersant resin preferably has an acid value, and the acid value is preferably 5 mg KOH/g or more, more preferably 10 to 200 mg KOH/g, and even more preferably 15 to 150 mg KOH/g. Further, an acid value of 20 to 100 mg KOH/g is preferable, and an acid value of 25 to 70 mg KOH/g is more preferable. In such a case, the thickening ratio of the white ink composition described later is preferably easily set to 5 times or more.

The acid value can be measured by the neutralization titration method in accordance with JIS K 0070. As a titration device, for example, "AT610" manufactured by Kyoto Electronics Manufacturing Co., Ltd. can be used.

Water

The white ink composition used in the recording method according to the present embodiment is an aqueous ink and preferably contains water. The "aqueous" refers that at least water is contained as a solvent component, and water may be included as a main solvent component. Examples of water include pure water such as ion exchange water, ultrafiltered water, reverse osmosis water, and distilled water, and water such as ultrapure water, from which ionic impurities are reduced. In addition, when water sterilized by irradiation with ultraviolet rays or addition of hydrogen peroxide or the like is used, the generation of bacteria and fungi can be suppressed when the white ink composition is stored for a long period of time.

The water content is preferably 30% by mass or more, and more preferably 30% to 99% by mass in the liquid medium component. Further, the water content is preferably 30% to 95% by mass, more preferably 40% to 90% by mass, and even more preferably 50% to 80% by mass. Here, the liquid medium is a solvent component such as water or an organic solvent.

In addition, the water content is preferably 30% by mass or more, more preferably 40% by mass or more, even more preferably 45% by mass or more, and particularly preferably 50% by mass or more, with respect to the total mass of the white ink composition. The upper limit of the water content is not particularly limited, and for example, the upper limit of the water content is preferably 99% by mass or less, more preferably 90% by mass or less, even more preferably 80% by mass or less, and still even more preferably 70% by mass or less with respect to the total mass of the ink composition.

When the water content is equal to or less than the above range, the reduction of dew condensation is more excellent, and this case is preferable. On the other hand, when the water content is equal to or more than the above range, the degree of freedom in ink design is high, and even in this case, according to the recording method of the present embodiment, excellent dew condensation reduction can be achieved, and this case is useful.

In addition, setting the water content of the ink composition to be attached first out of the white ink composition and the non-white ink composition described later to be within the above range is also preferable from the above point.

Organic Solvent

The white ink composition used in the recording method according to the present embodiment may contain an organic solvent. The organic solvent is preferably water-soluble. One of the functions of the organic solvent is to improve the wettability of the white ink composition with respect to the recording medium or to enhance the moisture retaining property of the white ink composition. The organic solvent can also function as a penetrant.

Examples of the organic solvent include esters, alkylene glycol ethers, cyclic esters, nitrogen-containing solvents, and polyhydric alcohols. Examples of the nitrogen-containing solvents include cyclic amides and acyclic amides. Examples of the acyclic amides include alkoxyalkylamides.

Examples of the esters include glycol monoacetates such as ethylene glycol monomethyl ether acetate, ethylene glycol monoethyl ether acetate, and ethylene glycol monobutyl ether acetate, and glycol diesters such as ethylene glycol diacetate, diethylene glycol diacetate, and propylene glycol diacetate.

The alkylene glycol ethers may be alkylene glycol monoethers or diethers, and alkyl ethers are preferable. Specific examples thereof include alkylene glycol monoalkyl ethers such as ethylene glycol monomethyl ether, ethylene glycol monoethyl ether, ethylene glycol monoisopropyl ether, ethylene glycol monobutyl ether, and diethylene glycol monomethyl ether, and alkylene glycol dialkyl ethers such as ethylene glycol dimethyl ether, ethylene glycol diethyl ether, ethylene glycol dibutyl ether, diethylene glycol dimethyl ether, and diethylene glycol diethyl ether.

Examples of the cyclic esters include cyclic esters (lactones) such as β-propiolactone, γ-butyrolactone, δ-valerolactone, ε-caprolactone, and β-butyrolactone, and compounds in which a hydrogen of a methylene group adjacent to a carbonyl group thereof is substituted with an alkyl group having 1 to 4 carbon atoms.

Examples of the alkoxyalkylamides include 3-methoxy-N, N-dimethylpropionamide, 3-methoxy-N, N-diethylpropionamide, 3-methoxy-N, N-methylethylpropionamide, 3-ethoxy-N, N-dimethylpropionamide, 3-ethoxy-N, N-diethylpropionamide, 3-ethoxy-N, N-methylethylpropionamide, 3-n-butoxy-N, N-dimethylpropionamide, 3-n-butoxy-N, N-diethylpropionamide, and 3-n-butoxy-N, N-methylethylpropionamide.

Examples of the cyclic amides include lactams, and examples thereof include pyrrolidones such as 2-pyrrolidone, 1-methyl-2-pyrrolidone, 1-ethyl-2-pyrrolidone, 1-propyl-2-pyrrolidone, and 1-butyl-2-pyrrolidone. These are preferable from the viewpoint of the solubility of the aggregating agent and promoting film formation with the resin particles described later, and 2-pyrrolidone is more preferable.

In addition, it is also preferable to use compounds represented by Formula (1) as the alkoxyalkylamides.

$$R^1\text{—O—}CH_2CH_2\text{—(C=O)—}NR^2R^3 \tag{1}$$

In Formula (1), $R^1$ represents an alkyl group having 1 or more and 4 or less carbon atoms, and $R^2$ and $R^3$ each independently represent a methyl group or an ethyl group. The "alkyl group having 1 or more and 4 or less carbon atoms" may be a linear or branched alkyl group, and examples thereof include a methyl group, an ethyl group, an n-propyl group, an iso-propyl group, an n-butyl group, a sec-butyl group, an iso-butyl group, and a tert-butyl group. The compounds represented by Formula (1) may be used alone or as a mixture of two or more thereof.

The function of the nitrogen-containing solvent is, for example, to enhance the surface dryness and fixability of the white ink composition attached to a low-absorbent recording medium. In particular, the compound represented by Formula (1) is excellent in the effect of appropriately softening and dissolving the vinyl chloride-based resin. Therefore, the compound represented by Formula (1) can soften and dissolve the surface to be recorded containing the vinyl chloride-based resin, and can allow the white ink composition to permeate into the low-absorbent recording medium. By allowing the white ink composition to permeate into the low-absorbent recording medium in this manner, the white ink composition is firmly fixed and the surface of the white ink composition is easily dried. Accordingly, the obtained image easily obtain excellent the surface dryness and fixability.

The content of the nitrogen-containing solvent is not particularly limited, and is about 5% by mass or more and 50% by mass or less, and preferably 10% by mass or more and 30% by mass or less with respect to the total mass of the white ink composition. When the content of the nitrogen-containing solvent is within the above range, the fixability and surface dryness of the image (particularly, the surface dryness when an image is recorded under an environment of high temperature and high humidity) can be further improved in some cases.

Examples of the polyhydric alcohols include 1,2-alkanediol (for example, alkanediols such as ethylene glycol, propylene glycol (alias: propane-1,2-diol), 1,2-butanediol, 1,2-pentanediol, 1,2-hexanediol, 1,2-heptanediol, and 1,2-octanediol), and polyhydric alcohols (polyols) excluding the 1,2-alkanediol (for example, diethylene glycol, dipropylene glycol, 1,3-propanediol, 1,3-butanediol (alias: 1,3-butylene glycol), 1,4-butanediol, 1,5-pentanediol, 1,6-hexanediol, 2-ethyl-2-methyl-1,3-propanediol, 2-methyl-2-propyl-1,3-propanediol, 2-methyl-1,3-propanediol, 2,2-dimethyl-1,3-propanediol, 3-methyl-1,3-butanediol, 2-ethyl-1,3-hexanediol, 3-methyl-1,5-pentanediol, 2-methylpentane-2,4-diol, trimethylol propane, and glycerin).

The polyhydric alcohols can be divided into alkanediols and polyols. The alkanediols are diols of an alkane having 5 or more carbon atoms. The number of carbon atoms of the alkane is preferably 5 to 15, more preferably 6 to 10, and even more preferably 6 to 8. 1,2-alkanediol is preferable.

The polyols are polyols of alkane having 4 or less carbon atoms or intermolecular condensates of hydroxyl groups of polyols of alkane having 4 or less carbon atoms. The number of carbon atoms of the alkane is preferably 2 to 3. The number of the hydroxyl groups in the molecule of the polyols is 2 or more, preferably 5 or less, and more preferably 3 or less. When the polyols are the intermolecular condensates described above, the number of intermolecular condensates is 2 or more, preferably 4 or less, and more preferably 3 or less. The polyhydric alcohols may be used alone or as a mixture of two or more types thereof.

The alkanediols and polyols can mainly function as a penetrating solvent and/or a moisturizing solvent. However, the alkanediols tend to have strong properties as the penetrating solvent, and polyols tend to have strong properties as the moisturizing solvent.

When the white ink composition contains an organic solvent, the organic solvent may be used alone, or may be used in combination of two or more thereof. In addition, the total content of the organic solvent is, for example, 5% by mass or more and 50% by mass or less, preferably 10% by mass or more and 45% by mass or less, more preferably 15% by mass or more and 40% by mass or less, and even more preferably 20% by mass or more and 40% by mass or less, with respect to the total mass of the white ink composition. When the content of the organic solvent is within the above range, the balance between wet spreadability and dryness is further improved, and an image with high image quality is easily formed.

Among the above-exemplified organic solvents, the white ink composition preferably contains an organic solvent having a normal boiling point of 150° C. to 280° C. The normal boiling point of the organic solvent is more preferably 160° C. to 270° C., even more preferably 170° C. to 260° C., and particularly preferably 180° C. to 250° C. In addition, the content of the organic solvent is preferably 10% to 50% by mass, more preferably 20% to 40% by mass, and even more preferably 25% to 35% by mass with respect to the total mass of the white ink composition.

The white ink composition does not contain an organic solvent of alkane polyols having a normal boiling point of higher than 280° C. in an amount of preferably more than 2% by mass, more preferably more than 1.5% by mass, even more preferably more than 1.0% by mass, still even more preferably more than 0.5% by mass, and particularly preferably more than 0.1% by mass with respect to the total mass of the white ink composition. The lower limit of the content of the organic solvent of the alkane polyols having a normal boiling point of higher than 280° C. may be 0% by mass.

By doing so, the formed image is satisfactorily dried, recording can be performed faster, and the adhesion to the recording medium can be improved. Further, it is more preferable that the white ink composition has an organic solvent (not limited to polyols) having a normal boiling point of higher than 280.0° C. within the above range.

Resin Particles

The white ink composition used in the recording method according to the present embodiment may contain resin particles. The resin particles can further improve the adhesion of an image due to the white ink composition attached to the recording medium. Examples of the resin particles include resin particles formed of urethane-based resins, acrylic resins (including styrene-acrylic resin), fluorene-based resins, polyolefin-based resins, rosin-modified resins, terpene-based resins, polyester-based resins, polyamide-based resins, epoxy-based resins, vinyl chloride-based resins, vinyl chloride-vinyl acetate copolymers, and ethylene vinyl acetate-based resins. Among these, a urethane-based resin, an acrylic resin, a polyolefin-based resin, and a polyester-based resin are preferable. These resin particles are often handled in the form of an emulsion, but may be in the form of powder. In addition, the resin particles can be used alone or in combination of two or more thereof.

Urethane-based resin is a generic term for resins having a urethane bond. For the urethane-based resin, a polyether-type urethane resin including an ether bond in the main chain, a polyester-type urethane resin including an ester bond in the main chain, a polycarbonate-type urethane resin including a carbonate bond in the main chain, and the like, in addition to a urethane bond, may be used. In addition, as the urethane-based resin, commercially available products may be used, for example, the urethane-based resin selected from the commercially available products such as Superflex 460, 460s, 840, E-4000 (product name, manufactured by DKS Co., Ltd.), Resamine D-1060, D-2020, D-4080, D-4200, D-6300, D-6455 (product name, manufactured by Dainichiseika Color & Chemicals MFG Co., Ltd.), Takelac WS-6021, W-512-A-6 (product name, manufactured by Mitsui Chemicals Polyurethane Co., Ltd.), Sancure 2710 (product name, manufactured by LUBRIZOL), Permarin UA-150 (product name, manufactured by Sanyo Chemical Industries Ltd.), and the like may be used.

Acrylic resin is a generic term for polymers obtained by polymerizing at least acrylic monomers such as (meth) acrylic acid and (meth)acrylic acid ester as one component, and examples thereof include a resin obtained from an acrylic monomer and a copolymer of an acrylic monomer and other monomers. Examples thereof include an acrylic-vinyl-based resin which is a copolymer of an acrylic monomer and a vinyl-based monomer, and the like. In addition, examples of the vinyl-based monomer include styrene and the like.

As the acrylic monomer, acrylamide, acrylonitrile, and the like can also be used. For the resin emulsion using acrylic resin as a raw material, a commercially available product may be used, and for example, any resin emulsion may be selected and used from FK-854 (trade name, manufactured by CHIRIKA Co., Ltd.), Mowinyl 952B, and 718A (trade names, manufactured by Japan Coating Resin Corporation), Nipol LX852 and LX874 (trade names, manufactured by Zeon Corporation), and the like.

Incidentally, in the present specification, the acrylic resin may be a styrene-acrylic resin described below. In addition, in the present specification, the notation of "(meth)acrylic" means at least one of acrylic and methacrylic.

The styrene-acrylic resin is a copolymer obtained from a styrene monomer and a (meth)acrylic monomer, and examples thereof include styrene-acrylic acid copolymers, styrene-methacrylic acid copolymers, styrene-methacrylic acid-acrylate copolymers, styrene-α-methylstyrene-acrylic acid copolymers, and styrene-α-methylstyrene-acrylic acid-acrylate copolymers. As the styrene acrylic resin, a commercially available product may be used, and for example, Joncryl 62J, 7100, 390, 711, 511, 7001, 632, 741, 450, 840, 74J, HRC-1645J, 734, 852, 7600, 775, 537J, 1535, PDX-7630A, 352J, 352D, PDX-7145, 538J, 7640, 7641, 631, 790, 780, and 7610 (trade names, manufactured by BASF SE), Mowinyl 966A and 975N (trade names, manufactured by Japan Coating Resin Corporation), VINYBLAN 2586 (manufactured by Nissin Chemical Industry Co., Ltd.), and the like may be used.

The polyolefin resin has an olefin such as ethylene, propylene, or butylene in the structural skeleton, and known ones can be appropriately selected and used. As the olefin resin, a commercially available product can be used, for example, ARROWBASE CB-1200, CD-1200 (trade name, manufactured by Unitika Ltd.), and the like may be used.

The glass transition temperature (Tg) of the resin particles is preferably −50° C. or higher and 200° C. or lower, more preferably 0° C. or higher and 150° C. or lower, and even more preferably 50° C. or higher and 100° C. or lower. Further, the glass transition temperature is particularly preferably 50° C. or higher and 80° C. or lower. When the glass transition temperature (Tg) of the resin particles is within the above range, the resin particles tend to be excellent in durability and clogging resistance. The glass transition temperature is measured, for example, using a differential scanning calorimeter "DSC7000", manufactured by Hitachi High-Tech Science Corporation, in accordance with JIS K 7121 (Testing Methods for Transition Temperatures of Plastics).

The volume average particle diameter of the resin particles is preferably 10 nm or more and 300 nm or less, more preferably 30 nm or more and 300 nm or less, even more preferably 30 nm or more and 250 nm or less, and particularly preferably 40 nm or more and 220 nm or less. The volume average particle diameter can be measured by the method described above.

The acid value of the resin of the resin particles is preferably 50 mg KOH/g or less, more preferably 30 mg KOH/g or less, even more preferably 20 mg KOH/g or less, and still even more preferably 10 mg KOH/g or less. Further, the lower limit of the acid value is 0 mg KOH/g or more, preferably 5 mg KOH/g or more, and more preferably 10 mg KOH/g or more. This case is preferable since the image quality and the like are excellent. The acid value can be measured by the method described above.

The content of the resin particles when the resin particles are contained in the white ink composition is, as solid content, 0.1% by mass or more and 20% by mass or less, preferably 1% by mass or more and 15% by mass or less, more preferably 2% by mass or more and 10% by mass or less, and particularly preferably 3% by mass or more and 7% by mass or less, with respect to a total mass of the white ink composition.

Wax

The white ink composition used in the recording method according to the present embodiment may contain a wax. Since the wax has a function of imparting smoothness to an image due to the white ink composition, peeling of the image due to the white ink composition can be reduced.

Examples of the components constituting the wax include plant or animal waxes such as carnauba wax, candelilla wax, beeswax, rice wax, and lanolin; petrolatum waxes, such as paraffin wax, microcrystalline wax, polyethylene wax, oxidized polyethylene wax, and petrolatum; mineral waxes, such as montan wax and ozokerite; synthetic waxes such as carbon wax, Hoechst wax, polyolefin wax, and stearic acid amide; and emulsions of natural synthetic waxes or compounded waxes such as an α-olefin maleic anhydride copolymer. These waxes can be used alone or a mixture of a plurality of types thereof may be used. Among these, from a viewpoint of obtaining more excellent in the effect of enhancing the fixability of the ink, it is preferable to use the polyolefin wax (in particular, polyethylene wax and polypropylene wax) and the paraffin wax.

As the wax, a commercially available product can be used, and examples thereof include NOPCOTE PEM-17 (trade name, manufactured by SAN NOPCO LIMITED), CHEMIPEARL W4005 (trade name, manufactured by Mitsui Chemicals, Inc.), and AQUACER 515, 539, and 593 (all trade names, manufactured by BYK Japan KK.).

Further, from the viewpoint of suppressing a decrease in performance due to excessive melting of wax when the recording method includes a heating step, it is preferable that the melting point of the wax used is preferably 50° C. or higher and 200° C. or lower, more preferably 70° C. or higher and 180° C. or lower, even more preferably 90° C. or higher and 150° C. or lower.

The wax may be supplied in the form of an emulsion or suspension. The content of the wax is 0.1% by mass or more and 10% by mass or less, more preferably 0.5% by mass or more and 5% by mass or less, even more preferably 0.5% by mass or more and 2% by mass or less, with respect to the total mass of the white ink composition, in terms of solid content. When the content of the wax is within the above range, the function of the wax can be satisfactorily exhibited. When one or both of the white ink composition and the non-white ink composition described later contain wax, a function of imparting smoothness to an image can be sufficiently obtained.

Surfactant

The white ink composition used in the recording method according to the present embodiment may contain a surfactant. The surfactant has a function of adjusting the surface tension of the white ink composition and adjusting, for example, the wettability with the recording medium. Among the surfactants, for example, an acetylene glycol-based surfactant, a silicone-based surfactant, and a fluorine-based surfactant can be preferably used.

The acetylene glycol-based surfactant is not particularly limited, and examples thereof include SURFYNOL 104, 104E, 104H, 104A, 104BC, 104DPM, 104PA, 104PG-50, 104S, 420, 440, 465, 485, SE, SE-F, 504, 61, DF37, CT111, CT121, CT131, CT136, TG, GA, and DF110D (all trade names, manufactured by Air Products & Chemicals. Inc.), OLFINE B, Y, P, A, STG, SPC, E1004, E1010, PD-001, PD-002W, PD-003, PD-004, EXP. 4001, EXP. 4036, EXP. 4051, AF-103, AF-104, AK-02, SK-14, and AE-3 (all trade names, manufactured by Nissin Chemical Industry Co., Ltd.), and ACETYLENOL E00, EOOP, E40, and E100 (all trade names, manufactured by Kawaken Fine Chemicals Co., Ltd.).

The silicone-based surfactant is not particularly limited, and examples thereof preferably include a polysiloxane-based compound. The polysiloxane-based compound is not particularly limited, and examples thereof include a polyether-modified organosiloxane. Examples of commercially available products of the polyether-modified organosiloxane include BYK-306, BYK-307, BYK-333, BYK-341, BYK-345, BYK-346, and BYK-348 (all trade names, manufactured by BYK Japan KK.), KF-351A, KF-352A, KF-353, KF-354L, KF-355A, KF-615A, KF-945, KF-640, KF-642, KF-643, KF-6020, X-22-4515, KF-6011, KF-6012, KF-6015, and KF-6017 (all trade names, manufactured by Shin-Etsu Chemical Co., Ltd.), and SILFACE SAG002, 005, 503A, 008 (all trade names, manufactured by Nissin Chemical Industry Co., Ltd.).

As the fluorine-based surfactant, a fluorine-modified polymer is preferably used, and specific examples thereof include BYK-3440 (manufactured by BYK Japan KK.), SURFLON S-241, S-242, and S-243 (all trade names, manufactured by AGC SEIMI CHEMICAL CO., LTD.), and FTERGENT 215M (manufactured by NEOS COMPANY LIMITED).

When the white ink composition contains a surfactant, a plurality of types of surfactants may be contained. When the white ink composition contains a surfactant, the content thereof can be set to 0.1% by mass or more and 2% by mass or less, preferably 0.4% by mass or more and 1.5% by mass or less, and more preferably 0.5% by mass or more and 1.0% by mass or less with respect to the total mass of the white ink composition.

Other Components

The white ink composition used in the recording method according to the present embodiment may contain components such as an additive, a resin dispersant, a preservative, a fungicide, a rust inhibitor, a chelating agent, a viscosity adjusting agent, an antioxidant, and the like, in addition to the above-described components, as long as the function is not impaired.

Examples of the additive include ureas, amines, and saccharides.

Examples of ureas include urea, ethyleneurea, tetramethylurea, thiourea, and 1,3-dimethyl-2-imidazolidinone, and betaines (such as trimethylglycine, triethylglycine, tripropy-lglycine, triisopropylglycine, N,N,N-trimethylalanine, N,N, N-triethylalanine, N,N,N-triisopropylalanine, N,N,N-trim-ethyl methyl alanine, carnitine, and acetyl carnitine).

Examples of the amines include diethanolamine, trietha-nolamine, and triisopropanolamine. The ureas or the amines may function as a pH adjuster.

Examples of the saccharides include glucose, mannose, fructose, ribose, xylose, arabinose, galactose, aldonic acid, glucitol (sorbitol), maltose, cellobiose, lactose, sucrose, trehalose, and maltotriose.

Physical Properties of White Ink Composition

In such a case, the viscosity of the white ink composition at 20° C. is preferably 1.5 mPa·s or more and 15 mPa·s or less, more preferably 1.5 mPa·s or more and 7 mPa·s or less, and even more preferably 1.5 mPa·s or more and 5.5 mPa·s or less. When the viscosity is within the above range, it is easy to efficiently form a predetermined image in the record-ing medium.

From the viewpoint of making wet spreadability to the recording medium appropriate, the surface tension of the white ink composition at 25° C. is preferably 40 mN/m or less, more preferably 38 mN/m or less, even more preferably 35 mN/m or less, still even more preferably 30 mN/m or less, and particularly preferably 25 mN/m or less. In addi-tion, the surface tension is preferably 20 mN/m or more, and more preferably 25 mN/m or more.

The viscosity and the surface tension can be measured as described above for the measurement of the physical prop-erties of the treatment liquid.

Viscosity Increase when Mixed with Treatment Liquid

The viscosity increase of the white ink composition when the treatment liquid and the white ink composition are mixed at a mass ratio of treatment liquid:white ink composition=1: 10 is preferably 5 times or more. By having such thickening property, the aggregating property of the components of the white ink composition is sufficiently obtained when being in contact with the above-described treatment liquid, and the image quality of the image formed by the white ink com-position and the image quality of the non-white ink com-position used together tend to be excellent. In particular, the thinness of a fine line used for characters or the like can be reduced. In addition, the treatment liquid used for measuring the viscosity increase preferably contains 7% by mass of calcium formate with respect to the total mass of the treatment liquid.

Here, regarding the increase in the viscosity of the ink when the ink is mixed with the treatment liquid, the "vis-cosity increase" is defined as follows. That is, the viscosity increase is a ratio (magnification) of the viscosity of the liquid mixture after mixing to the viscosity of the ink before mixing when the treatment liquid and the ink used in the recording method are used and mixed and stirred at a mass ratio of treatment liquid:ink of 1:10. The viscosity is mea-sured at 20° C. Therefore, the viscosity increase is a mag-nification of the viscosity after mixing based on the viscosity before mixing. The viscosity increase is, for example, about 0.5 times or more and 10.0 times or less. Depending on the composition of the ink, there is a case where the viscosity increase may less than 1.0 times and the viscosity may decrease, but the term is referred to as viscosity increase. In addition, the viscosity can be measured as described above as for the measurement of the physical properties of the treatment liquid.

The lower limit value of the viscosity increase of the white ink composition is preferably 5 times or more, more preferably more than 5 times, even more preferably 5.5 times or more, still even more preferably 6 times or more, and particularly preferably 7 times or more. Further, the lower limit value is preferably 10 or more.

On the other hand, the upper limit value of the viscosity increase of the white ink composition is not limited, and is preferably 20 times or less, more preferably 10 times or less, even more preferably 9 times or less, still even more preferably 8.5 times or less, and still yet even more prefer-ably 8 times or less. When the viscosity increase of the white ink composition is within the above range, the image quality, the crack resistance, the scratch resistance, the ejection stability, and the like are more excellent, and this case is preferable. In addition, the image quality of the non-white ink composition used together is also excellent, and there is a tendency that the thinness of a fine line used for characters or the like can be reduced. In addition, since the image quality is excellent even when the attachment amount of the ink is large, the attachment amount of the ink can be increased, and the background concealment of the white image tends to be excellent.

The viscosity increase of the white ink composition can be mainly adjusted by adjusting the type, content, and the like of the white coloring material (including the resin dispersant) and the resin particles. In particular, it is pref-erable to adjust the viscosity increase by adjusting the type, content, and the like of the white coloring material (includ-ing the resin dispersant) since the adjustment is easily made.

1.3 Non-White Ink Attachment Step

The recording method according to the present embodi-ment includes a non-white ink attachment step of ejecting a non-white ink composition containing a non-white coloring material from the ink jet head and attaching the non-white ink composition to the recording medium.

1.3.1 Attachment Form

The non-white ink attachment step of the recording method according to the present embodiment is performed by scanning in which a non-white ink composition is ejected from the ink jet head and attached to the recording medium while the ink jet head is moved with respect to the recording medium in a state where the position is fixed, the non-white ink composition is attached to the scanning region of one scanning in one scanning, and the surface temperature of the recording medium in the non-white ink attachment step is 35° C. or lower. Such an attachment form is the same as that of the white ink attachment step described above, and thus, the detailed description thereof is omitted.

Further, the attachment form other than the above can be the same as the white ink attachment step described above.

In the recording method according to the present embodi-ment, the maximum attachment amount range of the ink composition in a step performed later out of the white ink attachment step described above and the non-white ink attachment step is preferably 1 mg/inch$^2$ or more, more preferably 3 mg/inch$^2$ or more, and even more preferably 5 mg/inch$^2$ or more. The upper limit of the maximum attach-ment amount range is not particularly limited, and is pref-erably 20 mg/inch$^2$ or less, more preferably 15 mg/inch$^2$ or less, even more preferably 10 mg/inch$^2$ or less, and particu-larly preferably 8 mg/inch$^2$ or less. In addition, regardless of the step order, the maximum attachment amount range of the non-white ink composition in the non-white ink attachment step is preferably set to the above range.

From the viewpoint of being able to satisfactorily sup-press dew condensation, the maximum weight range per droplet of the liquid droplets of the non-white ink compo-sition in the non-white ink attachment step is preferably 1 to 15 ng, more preferably 2 to 14 ng, even more preferably 3 to 13 ng, and particularly preferably 4 to 10 ng.

1.3.2 Non-White Ink Composition

Hereinafter, each component contained in the non-white ink composition used in the non-white ink attachment step will be described. The components of the non-white ink composition other than the coloring material are the same as those of the white ink composition described above, and can be selected independently of the white ink composition. Any of these components may be the same as that in the white ink composition described above, and the "white ink composition" can be replaced with "non-white ink composition".

Non-White Coloring Material

The non-white ink composition contains a non-white coloring material. The non-white coloring material contained in the non-white ink composition refers to a coloring material other than the white coloring material described above. The non-white coloring material is preferably a coloring material such as cyan, yellow, magenta, and black. Examples of the non-white coloring material include dyes, pigments, and the like.

The non-white coloring material may be either a dye or a pigment, or may be a mixture. However, among dyes and pigments, it is more preferable to include pigments. The pigment is excellent in storage stability such as light resistance, weather resistance, and gas resistance, and is preferably an organic pigment from that viewpoint.

Specifically, as the pigment, azo pigments such as insoluble azo pigments, condensed azo pigments, azo lakes, and chelated azo pigments, polycyclic pigments such as phthalocyanine pigments, perylene and perinone pigments, anthraquinone pigments, quinacridone pigments, dioxane pigments, thioindigo pigments, isoindolinone pigments, and quinophthalone pigments, dye chelates, dye lakes, nitro pigments, nitroso pigments, aniline black, daylight fluorescent pigments, carbon black, and the like can be used. These pigments may be used alone or in combination of two or more thereof. In addition, as the non-white coloring material, a photoluminescent pigment may be used.

Specific examples of the pigments are not particularly limited, but examples thereof include the following.

Examples of black pigments include No. 2300, No. 900, MCF 88, No. 33, No. 40, No. 45, No. 52, MA7, MA8, MA100, and No. 2200 B (all manufactured by Mitsubishi Chemical Corporation), Raven 5750, Raven 5250, Raven 5000, Raven 3500, Raven 1255, and Raven 700 (all manufactured by Columbia Carbon Inc.), Regal 400R, Regal 330R, Regal 660R, Mogul L, Monarch 700, Monarch 800, Monarch 880, Monarch 900, Monarch 1000, Monarch 1100, Monarch 1300, and Monarch 1400 (manufactured by CABOT JAPAN K.K.), Color Black FW1, Color Black FW2, Color Black FW2V, Color Black FW18, Color Black FW200, Color Black S150, Color Black S160, Color Black S170, Printex 35, Printex U, Printex V, Printex 140U, Special Black 6, Special Black 5, Special Black 4A, and Special Black 4 (all manufactured by Degussa).

Examples of yellow pigments include C.I. Pigment Yellow 1, 2, 3, 4, 5, 6, 7, 10, 11, 12, 13, 14, 16, 17, 24, 34, 35, 37, 53, 55, 65, 73, 74, 75, 81, 83, 93, 94, 95, 97, 98, 99, 108, 109, 110, 113, 114, 117, 120, 124, 128, 129, 133, 138, 139, 147, 151, 153, 154, 167, 172, and 180.

Examples of magenta pigments include C.I. Pigment Red 1, 2, 3, 4, 5, 6, 7, 8, 9, 10, 11, 12, 14, 15, 16, 17, 18, 19, 21, 22, 23, 30, 31, 32, 37, 38, 40, 41, 42, 48 (Ca), 48 (Mn), 57 (Ca), 57:1, 88, 112, 114, 122, 123, 144, 146, 149, 150, 166, 168, 170, 171, 175, 176, 177, 178, 179, 184, 185, 187, 202, 209, 219, 224, 245, or C.I. Pigment Violet 19, 23, 32, 33, 36, 38, 43, and 50.

Examples of cyan pigments include C. I. Pigment Blue 1, 2, 3, 15, 15:1, 15:2, 15:3, 15:34, 15:4, 16, 18, 22, 25, 60, 65, and 66, and C. I. Bat blue 4 and 60.

In addition, pigments other than the magenta, cyan, and yellow pigments are not particularly limited and examples thereof include C.I. Pigment Green 7, 10, C.I. Pigment Brown 3, 5, 25, 26, and C.I. Pigment Orange 1, 2, 5, 7, 13, 14, 15, 16, 24, 34, 36, 38, 40, 43, and 63.

The pearl pigment is not particularly limited and examples thereof include pigments having pearl luster or interference luster such as titanium dioxide coated mica, fish scale foil, and bismuth acid chloride.

The metallic pigment is not particularly limited and examples thereof include particles formed of aluminum, silver, gold, platinum, nickel, chromium, tin, zinc, indium, titanium, copper, and the like, alone or in alloys.

In addition, as dyes, for example, various dyes normally used for ink jet recording such as direct dyes, acidic dyes, edible dyes, basic dyes, reactive dyes, dispersion dyes, construction dyes, soluble construction dyes, reaction dispersion dyes, and the like can be used.

It is preferable that the non-white coloring material can be stably dispersed or dissolved in the dispersion medium, and depending on the necessity, a dispersant may be used to disperse the non-white coloring material. Examples of the dispersant include the same dispersants used for improving the dispersibility of the white coloring material of the white ink composition described above. The dispersant is preferably a dispersant resin.

The acid value of the dispersant resin of the non-white coloring material may be the same as the acid value of the dispersant resin of the white coloring material described above, and is preferably 30 mg KOH/g or more. The acid value of the dispersant resin of the non-white coloring material is preferably higher than the acid value of the dispersant resin of the white coloring material, is more preferably 5 mg KOH/g or more, and even more preferably 10 to 30 mg KOH/g higher than the acid value of the dispersant resin of the white coloring material. This case is preferable since the image quality and the like are excellent.

The content of the non-white coloring material is preferably 0.3% by mass or more and 20% by mass or less, and more preferably 0.5% by mass or more and 15% by mass or less with respect to the total mass of the non-white ink composition. Further, the content is preferably 1% by mass or more and 10% by mass or less, and more preferably 2% by mass or more and 7% by mass or less.

When a pigment is adopted for the non-white coloring material, the volume average particle diameter of the pigment particles is preferably 10 nm or more and 300 nm or less, more preferably 30 nm or more and 250 nm or less, even more preferably 50 nm or more and 250 nm or less, and particularly preferably 70 nm or more and 200 nm or less. Further, the volume average particle diameter is preferably 80 nm or more and 150 nm or less. The volume average particle diameter of the non-white coloring material is measured as an initial state by a method of confirming the above-described volume average particle diameter. When the volume average particle diameter is within the above range, this case is preferable from a viewpoint that a desired coloring material is easily obtained or characteristics of the coloring material and the like are easily improved.

Water

The non-white ink composition used in the recording method according to the present embodiment is an aqueous ink and preferably contains water. Since the type, content, and the like of water that can be used are the same as those of the white ink composition described above, the detailed description thereof will be omitted.

Organic Solvent

The non-white ink composition used in the recording method according to the present embodiment may contain an organic solvent. Since the types, contents, and the like of the organic solvent that can be used are the same as those of the white ink composition described above, the detailed description thereof will be omitted.

The non-white ink composition preferably contains an organic solvent having a normal boiling point of 150° C. to 280° C. The normal boiling point of the organic solvent is more preferably 160° C. to 270° C., even more preferably 170° C. to 260° C., and particularly preferably 180° C. to 250° C. In addition, the content of the organic solvent is preferably 10% to 50% by mass, more preferably 20% to 40% by mass, and even more preferably 25% to 35% by mass with respect to the total mass of the non-white ink composition.

The non-white ink composition does not contain an organic solvent of alkane polyols having a normal boiling point of higher than 280° C. in an amount of preferably more than 2% by mass, more preferably more than 1.5% by mass, even more preferably more than 1.0% by mass, still even more preferably more than 0.5% by mass, and particularly preferably more than 0.1% by mass with respect to the total mass of the non-white ink composition. The lower limit of the content of the organic solvent of the alkane polyols having a normal boiling point of higher than 280° C. may be 0% by mass.

Resin Particles

The non-white ink composition used in the recording method according to the present embodiment may contain resin particles. Since the type, content, and the like of the resin particles that can be used are the same as those of the white ink composition described above, the detailed description thereof will be omitted.

Wax

The non-white ink composition used in the recording method according to the present embodiment may contain a wax. Since the type, content, and the like of the wax that can be used are the same as those of the white ink composition described above, the detailed description thereof will be omitted.

Surfactant

The non-white ink composition used in the recording method according to the present embodiment may contain a surfactant. Since the type, content, and the like of the surfactant that can be used are the same as those of the white ink composition described above, the detailed description thereof will be omitted.

Other Components

Similar to the white ink composition described above, the non-white ink composition used in the recording method according to the present embodiment may contain components such as an additive, a resin dispersant, a preservative, a fungicide, a rust inhibitor, a chelating agent, a viscosity adjusting agent, an antioxidant, and the like, in addition to the above-described components, as long as the function is not impaired.

Physical Properties of Non-White Ink Composition

Since the viscosity and surface tension of the non-white ink composition are the same as those of the white ink composition described above, the detailed description thereof will be omitted.

Viscosity Increase when Mixed with Treatment Liquid

The viscosity increase of the non-white ink composition when the treatment liquid and the non-white ink composition are mixed at a mass ratio of treatment liquid:non-white ink composition=1:10 is preferably 5 times or more. By having such thickening property, the aggregating property of the components of the non-white ink composition is sufficiently obtained when being in contact with the above-described treatment liquid, and the image quality of the image formed by the non-white ink composition and the image quality of the white ink composition used together tend to be excellent. In particular, the thinness of a fine line used for characters or the like can be reduced. In addition, the treatment liquid used for measuring the viscosity increase preferably contains 7% by mass of calcium formate with respect to the total mass of the treatment liquid.

The lower limit value of the viscosity increase of the non-white ink composition is preferably 5 times or more, more preferably more than 5 times, even more preferably 5.5 times or more, still even more preferably 6 times or more, and particularly preferably 7 times or more. Further, the lower limit value is preferably 10 or more.

On the other hand, the upper limit value of the viscosity increase of the non-white ink composition is not limited, and is preferably 20 times or less, more preferably 10 times or less, even more preferably 9 times or less, still even more preferably 8.5 times or less, and still yet even more preferably 8 times or less. When the viscosity increase of the non-white ink composition is within the above range, the image quality, the crack resistance, the scratch resistance, the ejection stability, and the like are more excellent, and this case is preferable. In particular, there is a tendency that the thinness of a fine line used for characters or the like can be reduced, and there also is a tendency that the image quality of the white ink composition used together is excellent.

The viscosity increase of the non-white ink composition can be mainly adjusted by adjusting the type, content, and the like of the non-white coloring material (including the resin dispersant) and the resin particles. In particular, it is preferable to adjust the viscosity increase by adjusting the type, content, and the like of the non-white coloring material (including a resin dispersant) since the adjustment is easily made.

1.4 Transport Step

The recording method according to the present embodiment may include a transport step of transporting the recording medium, but the recording medium is not transported when scanning is performed.

In addition, it is preferable that, on the scanning region in which scanning in one of the white ink attachment step and the non-white ink attachment step is performed, scanning in the other step is performed without performing the transport step. That is, it is preferable that the position of the recording medium is fixed until scanning in one of the white ink attachment step and the non-white ink attachment step is performed, and scanning in the other step is performed on the scanning region in which the scanning in the one step is performed.

In the above case, it is preferable to perform the transport step after the scanning in the other step is completed or before the scanning in the one step is performed.

Through the transport step, the portion of the recording medium in which the ink is not attached is transported to the location where the ink attachment step is performed, or the portion of the recording medium in which the attachment of the ink is completed is moved from the location where the ink attachment step is performed.

More specifically, referring to FIG. 1, a recording unit 31 ejects the white ink composition or the non-white ink composition to the surface of the sheet S from the nozzle N of the ink jet head 35 while moving the carriage 32 in a direction parallel to the X-axis direction, and attaches the ink to the scanning region of one scanning in one scanning. Subsequently, it is preferable that while moving the carriage 32 again in the direction parallel to the X-axis direction without transporting the sheet S, the non-white ink composition or the white ink composition is ejected from the nozzle N of the ink jet head 35 to the surface of the sheet S, and the ink is attached to the scanning region of one scanning in one scanning.

According to such an aspect, recording can be performed at a higher speed, but the vapor concentration on the recording medium is higher during the main scanning in the other step for attaching the next ink. Thus, dew condensation on the nozzle surface more easily occurs. Even in such a case, according to the recording method according to the present embodiment, dew condensation can be satisfactorily suppressed.

The transport direction of the recording medium in the transport step may be a direction along the axis of the scanning direction of the main scanning, or may be a direction along an axis intersecting the axis of the scanning direction of the main scanning. Here, when the scanning region of the medium to which the ink can be attached in one main scanning is widened, the area of the printing region per unit time increases, and thus, the recording speed can be further increased. By increasing the number of nozzles arranged in the ink jet head and extending the length of the ink jet head, the scanning region of the medium to which the ink can be attached can be widened, but the length that can be extended is limited from the cost and the like. Therefore, in order to efficiently use the length of the ink jet head, it is preferable to install the ink jet head so as to be parallel to the width direction of the recording medium. In this case, the plurality of nozzles in the ink jet head are aligned in parallel to the direction along the axis intersecting the axis of the scanning direction of the main scanning. That is, the transport direction of the recording medium is a direction along the axis of the scanning direction of the main scanning. That is, the transport direction may be either the right direction or the left direction in FIG. 1. In the example of FIG. 1, the direction is the right direction.

As described above, from the viewpoint of being able to easily further increase the recording speed, it is preferable that the recording method according to the present embodiment includes the transport step of transporting the recording medium after the scanning of the white ink attachment step and the scanning of the non-white ink attachment step, and the transport direction of the transport step is a direction along the axis of the scanning direction of the scanning.

Similarly, from the viewpoint of being able to easily further increase the recording speed, it is preferable that the ink jet head has a nozzle row formed of a plurality of nozzles for ejecting the ink composition, and the length of the nozzle row in the in the length direction is equal to or longer than the length of the recordable region of the recording medium in the direction.

From the viewpoint of being able to further increase the recording speed, the length of the nozzle row of the ink jet head in the length direction is preferably 10 cm or more, more preferably 20 cm or more, even more preferably 30 cm or more, and particularly preferably 33 cm or more. The upper limit of the length is not limited, and is preferably 100 cm or less, more preferably 80 cm or less, and even more preferably 50 cm or less.

1.5 Post-Heating Step

The recording method according to the present embodiment may further include a post-heating step of heating the recording medium after each of the attachment steps described above. The post-heating step can be performed, for example, by using an appropriate heating unit. The post-heating step corresponds to, for example, an after-heater (a drying section 4 in the example of the recording apparatus 100 described later, also referred to as a secondary heater). In addition, the heating unit is not limited to the heating unit provided in the recording apparatus, and other drying units may be used. With this, the obtained image can be dried and more sufficiently fixed, and thus, for example, the recorded matter can be used in a state of being usable at an early stage. The post-heating step is also referred to as a secondary heating step.

A temperature of the recording medium in this case is not particularly limited, and may be set in consideration of Tg of the resin component constituting the resin particles contained in the recorded matter and the like, for example. When considering the Tg of the resin component constituting the resin particles or wax, the Tg may be set to be 5.0° C. or higher, and preferably set to be 10.0° C. or higher than the Tg of the resin component constituting the resin particles.

The surface temperature of the recording medium reached by heating in the post-heating step is 30.0° C. or higher and 120.0° C. or lower, preferably 40.0° C. or higher and 100.0° C. or lower, more preferably 50.0° C. or higher and 95° C. or lower, and even more preferably 70° C. or higher and 90° C. or lower. The surface temperature of the recording medium reached by heating in the post-heating step is particularly preferably 70° C. or higher. When the temperature of the recording medium is within this range, film formation and flattening with the resin particles or wax contained in the recorded matter can be performed, and there is a tendency that the obtained image can be dried and more sufficiently fixed.

1.6 Other Steps

The recording method according to the present embodiment may include a primary drying step. The primary drying step is a step of drying the recording medium before or during the attachment step of the treatment liquid and the ink composition. The primary drying step can be performed by a unit that stops recording and leaves the recording medium to stand, or by a unit that performs drying using a drying mechanism. Examples of the unit that performs drying using a drying mechanism include a unit that blows normal temperature air or warm air onto the recording medium (ventilation type), a unit that irradiates the recording medium with radiation (such as infrared rays) which generates heat, (radiation type), a member that comes into contact with the recording medium and conducts heat to the recording medium (conduction type), and a combination of two or more of these units. When the primary drying step is provided, it is preferable to perform the primary drying step using the ventilation type unit among these drying units.

In the primary drying step, a case where the drying mechanism that heats the recording medium is used as the drying mechanism is particularly referred to as the primary heating step. For example, the drying mechanism corresponds to the conduction type, the radiation type, and the ventilation type using warm air among the above-described drying mechanisms. The drying step of performing air blowing at normal temperature does not correspond to the heating step of performing heating.

When the primary drying step that is not the heating step is provided, it is preferable that the surface temperature of the recording medium is easily set to 35° C. or lower while obtaining an excellent image quality by promoting drying.

The drying step can be performed simultaneously with one or two or more of the treatment liquid attachment step and the ink attachment step described above. When the drying step is performed simultaneously with the ink attachment step, the surface temperature of the recording medium is 35° C. or lower, preferably 33° C. or lower, more preferably 31° C. or lower, even more preferably 29° C. or lower, and particularly preferably 27° C. or lower.

In addition, each of the attachment steps may not include the primary heating step. That is, it is preferable that in the recording method of the present embodiment, the recording medium is not heated by the heating mechanism for heating the recording medium provided in the member supporting the recording medium, and the recording medium is not heated by the heating mechanism for heating the recording medium from above at the location where the ink composition is attached. In such a case, since the surface temperature of the recording medium in the ink attachment step is easily set to a low temperature equal to or lower than a predetermined temperature, evaporation of the solvent component of the ink is further suppressed, and the temperature difference between the nozzle surface and the vicinity of the platen is suppressed to be lower, there is a tendency that dew condensation can be further reduced.

2. Recording Apparatus

A recording apparatus according to an embodiment of the present disclosure is a recording apparatus that performs recording by the above-described recording method, and includes the treatment liquid, the white ink composition, the non-white ink composition, and the ink jet head.

According to the recording apparatus according to the present embodiment, since the recording is performed by the above-described recording method, dew condensation can be suppressed while providing an excellent recording speed and the image quality (density unevenness) can be excellent.

Figure 2:
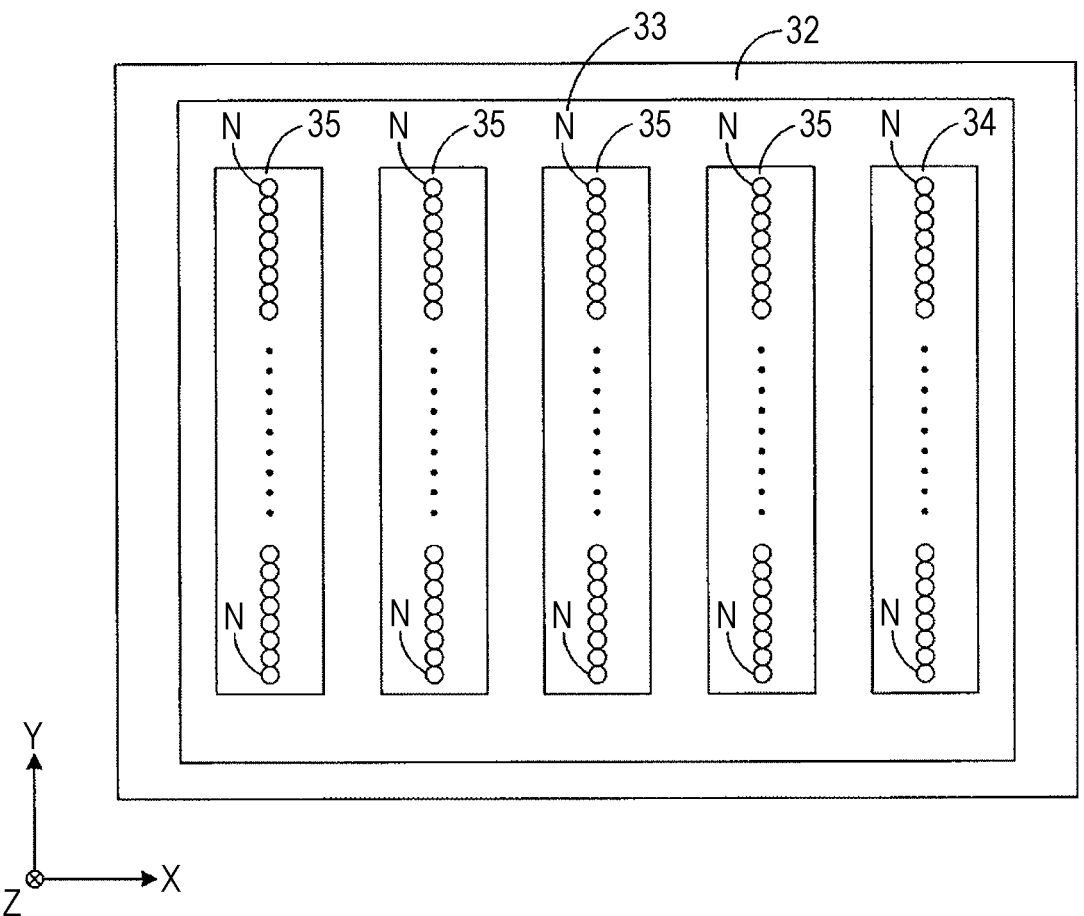
FIG. 2 is a bottom view partially showing a configuration of a recording unit.

FIG. 1 is a front view schematically showing an example of a recording apparatus according to the present embodiment. In FIGS. 1 and 2, XYZ orthogonal coordinates are provided as appropriate for clarity of arrangement relationships of each section of the apparatus, and in the XYZ orthogonal coordinates, a Z-axis is designated as a vertical axis. Further, in the following description, a direction in which each coordinate axis (arrow) orients will be referred to as a positive direction, and a direction opposite to the positive direction will be referred to as a negative direction as appropriate. The form of the recording apparatus shown in FIG. 1 is a serial type recording apparatus, but since the recording medium is transported in the direction along the axis in the scanning direction, the form is also particularly referred to as a lateral type recording apparatus.

The recording apparatus 100 includes a host device 200 configured to generate print data from image data (bit map data) received from an external device such as a personal computer, and a printer section 300 configured to print an image based on the print data received from the host device 200. The printer section 300 transports a long sheet S in a roll-to-roll manner, and prints an image on a surface of the sheet S by using an ink jet method.

As shown in FIG. 1, the printer section 300 includes a main body case 1 having a substantially rectangular parallelepiped shape. Inside the main body case 1, a feeding section 2 configured to feed the sheet S from a roll R1 formed by winding the sheet S, a printing chamber 3 configured to eject ink onto the surface of the sheet S fed to perform printing, a drying section 4 configured to dry the sheet S to which the ink is attached, and a winding section 5 configured to wind the sheet S dried as a roll R2 are arranged.

More specifically, the inside of the main body case 1 vertically partitioned in a Z-axis direction by a base 6 having a flat plate shape and arranged parallel (that is, horizontally) to an XY plane, and the upper side of the base 6 is the printing chamber 3. The platen 30 is fixed to an upper surface of the base 6 at a substantially center portion in the printing chamber 3. The platen 30 has a rectangular shape, and supports the sheet S from below by the upper surface parallel to the XY plane. Then, the recording unit 31 performs printing on the surface of the sheet S supported on the platen 30.

On the other hand, the feeding section 2, the drying section 4, and the winding section 5 are arranged on the lower side of the base 6. The feeding section 2 is arranged on a lower side (diagonally left downward in FIG. 1) with respect to the platen 30, and includes a feeding shaft 21 that is rotatable. The sheet S is wound around the feeding shaft 21 and thus the roll R1 is supported. On the other hand, the winding section 5 is arranged on the lower side (diagonally right downward in FIG. 1) in the X-axis positive direction with respect to the platen 30, and includes a winding shaft 51 that is rotatable. The sheet S is wound around the winding shaft 51 and thus the roll R2 is supported. Further, the drying section 4 is arranged between the feeding section 2 and the winding section 5 in the X-axis direction and immediately below the platen 30.

Then, the sheet S fed from the feeding shaft 21 of the feeding section 2 sequentially passes through the printing chamber 3 and the drying section 4 while being guided by the rollers 71 to 77, and then is wound onto the winding shaft 51 of the winding section 5. Note that the rollers 72 and 73 are arranged to be straightly aligned in the X-axis direction (that is, horizontally) with the platen 30 interposed between the rollers and, and the top of each of the rollers and is adjusted to be positioned at the same height to the upper surface (surface supporting the sheet S) of the platen 30. Therefore, the sheet S wound on the roller 72 slides onto the upper surface of the platen 30 and moves horizontally (X-axis direction) to the roller 73.

In the printing chamber 3, a printing process on the sheet S is performed by the recording unit 31 arranged on the upper side of the platen 30. The recording unit 31 ejects the treatment liquid, the white ink composition, and the non-white ink composition onto the surface of the sheet S to print an image on the surface of the sheet S. Here, an end portion (left end portion in FIG. 1) in the X-axis negative direction inside the printing chamber 3 is provided with a cartridge attaching section 8. A treatment liquid cartridge 81 configured to store the treatment liquid and a plurality of ink cartridges 82 configured to respectively store the white ink composition and the non-white ink composition are detachably attached to the cartridge attaching section 8. Then, the recording unit 31 can eject the treatment liquid supplied from the treatment liquid cartridge 81 and the ink composition supplied from the ink cartridges 82 onto the surface of the sheet S by the ink jet method, respectively.

FIG. 2 is a bottom view partially showing the configuration of the recording unit. Here, the recording unit 31 will be described in detail with reference to FIGS. 1 and 2. The recording unit 31 has a carriage 32, a support plate 33 having a flat plate shape and attached to a lower surface of the carriage 32, and ink jet heads 34 and 35 attached to a lower surface of the support plate 33. On the lower surface of the support plate 33, four ink jet heads 35 and one ink jet head 34 are aligned at equal pitches in the X-axis direction, and a plurality of nozzles N are aligned in parallel to the Y-axis direction in each of the ink jet heads 34 and 35. Then, the ink jet head 34 ejects the treatment liquid from the nozzles N, and each of the four ink jet heads 35 ejects inks of different colors, that is, the white ink composition and the non-white ink composition, from the nozzles N.

The description will be continued returning to FIG. 1. The carriage 32 of the recording unit 31 configured as described above is integrally movable with the support plate 33 and the ink jet heads 34 and 35. That is, an X-axis guide rail 37 extending parallel to the X-axis direction is provided in the printing chamber 3, and when the carriage 32 receives a driving force of an X-axis motor, the carriage moves along the X-axis guide rail 37 in the X-axis direction.

With reference to FIGS. 6A, 6B, and 6C, recording by the recording apparatus in FIG. 1 will be described. An ink jet head H is mounted on the carriage 32. In FIGS. 6A, 6B, and 6C, the ink jet head H has a nozzle row W in which a plurality of nozzles N that eject the white ink are aligned in the nozzle row direction, four nozzle rows C in which a plurality of nozzles N that eject the non-white ink are aligned in the nozzle row direction, and a nozzle row R in which a plurality of nozzles N that eject the treatment liquid are aligned in the nozzle row direction. FIGS. 6A, 6B, and 6C are views when viewed from the recording surface side where recording of the recording medium is performed, and the nozzle row is described on the front side of the drawing. However, in reality, the nozzle row is on the back side of the drawing, and is directed to the medium.

In FIGS. 6A, 6B, and 6C, the sheet S is referred to as a recording medium M. The sheet S is fed from the roll R1 and transported onto a platen P.

In FIG. 6A, the recording apparatus ejects the white ink composition to the surface of the sheet S from the nozzle row W of the ink jet head H while moving the carriage 32 in a forward direction (scanning direction MS, right direction in the drawing) parallel to the X-axis direction, and attaches the white ink composition to the scanning region of one scanning in one scanning. In the drawing, the ink jet head H is in a state in which the ink jet head has advanced to substantially half of the scanning distance in the scanning direction, but the ink jet head H scans the scanning distance in the scanning direction to the end.

At this time, the sheet S stops on the upper surface of the platen P. In the same scanning as the one scanning, the treatment liquid is ejected from the nozzle row R of the ink jet head H to the surface of the sheet S with respect to the same scanning region.

Subsequently, in FIG. 6B, the carriage 32 returns to the initial position, while the carriage 32 is moved again in the forward direction parallel to the X-axis direction, the non-white ink composition is ejected from the nozzle row C to the surface of the sheet S, and the non-white ink composition is attached to the scanning region of one scanning in one scanning. Accordingly, the non-white ink is attached to the scanning region to which the white ink composition is attached.

In the same scanning as the one scanning, the treatment liquid is ejected from the nozzle row R to the surface of the sheet S with respect to the same scanning region.

The recording unit 31 does not return to the initial position, and scanning in which the non-white ink composition is attached while the carriage 32 is moved in backward direction (the left direction in the drawing) parallel to the X-axis direction may be performed in the same manner.

Therefore, on the surface of the sheet S, a two-dimensional image for one frame, in which the length of the nozzle row in the Y direction is the distance of the scanning in the X axis direction, is printed. Further, the coloring material of the ink forming the two-dimensional image is aggregated by the action of the treatment liquid and fixed on the surface of the sheet S.

Next, the sheet S is transported in a transport direction SS (the right direction in the drawing) at a length corresponding to one frame in the X-axis direction, and the sheet S for one frame is moved from the platen P.

Next, in FIG. 6C, scanning in which the white ink composition is attached is performed on a new portion of the sheet S stopped on the upper surface of the platen P. Next, in FIG. 6D, scanning in which the non-white ink composition is attached is performed. The scanning of FIG. 6C and the scanning of FIG. 6D are the same as the scanning of FIG. 6A and the scanning of FIG. 6B, respectively. Accordingly, the image for the next one frame is printed. Further, when recording is continued, the transport of the sheet S in FIG. 6B and the subsequent steps may be repeated.

As another embodiment, the recording apparatus may print an image on the surface of the sheet S stopped on the upper surface of the platen 30 by ejecting the treatment liquid and the ink composition from the ink jet heads 34 and 35 while reciprocating the carriage 32 above the platen 30 in the Y-axis direction. In this case, a Y-axis guide rail (not shown) extending parallel to the Y-axis direction is provided inside the printing chamber 3, and when the carriage 32 receives driving force of a Y-axis motor (not shown), the carriage 32 moves in the Y-axis direction along the Y-axis guide rail. Further, the ink jet heads 35 and 34 are aligned at an equal pitch in the Y-axis direction, and the plurality of nozzles N are aligned in parallel to the X-axis direction in each of the ink jet heads 34 and 35.

Printing of one frame as described above is repeatedly performed while intermittently moving the sheet S in the X-axis direction. Specifically, a predetermined range over substantially the entire upper surface of the platen 30 serves as a printing region. Then, assuming a distance corresponding to a length in the X-axis direction of the printing region (intermittent transport distance) as a unit, the sheet S is intermittently transported in the X-axis direction, and printing of one frame is performed on the sheet S stopped the upper surface of the platen 30 during the intermittent transport. In other words, when the printing of one frame ends on the sheet S stopped on the platen 30, the sheet S is transported in the X-axis direction by the intermittent transport distance to cause an unprinted surface of the sheet S to be stopped on the platen 30. Subsequently, the printing of one frame is newly performed on the unprinted surface. When the printing is completed, the sheet S is again transported in the X-axis direction by the intermittent transport distance. Then, a series of these operations is repeatedly performed.

In order to keep leveling the sheet S stopped on the upper surface of the platen 30 during the intermittent transport, the platen 30 may include a mechanism that sucks the sheet S stopped on the upper surface thereof. Specifically, a large number of suction holes (not shown) are opened on the upper surface of the platen 30, and a suction section 38 is attached to the lower surface of the platen 30. Then, the suction section 38 operates, and negative pressure occurs in the suction holes on the upper surface of the platen 30 to suck the sheet S onto the upper surface of the platen 30. Then, while the sheet S is stopped on the platen 30 for printing, the suction section 38 sucks the sheet S to keep leveling the sheet S. On the other hand, when the printing ends, the suction section 38 stops sucking the sheet S, and thus, the sheet S can be smoothly transported.

The heater 39 may be attached to the lower surface of the platen 30. The heater 39 can heat the platen 30 to a predetermined temperature (for example, 30° C.) as necessary. With this, the sheet S can be primary dried by the heat of the platen 30 while receiving the printing process by the ink jet heads 34 and 35.

However, in the recording apparatus according to the present embodiment, the recording medium may be heated by a heating mechanism (for example, a heater 39) for heating the recording medium provided in the member supporting the recording medium or a heating mechanism (not shown) for heating the recording medium from above at a location where the ink composition is attached as on the platen 30. Examples of the heating mechanism for heating the recording medium from above include a blower fan, an IR heater, and the like.

However, even when heating is performed, the surface temperature of the recording medium when attaching the ink is 35° C. or lower, and it is preferable not to perform heating.

With this, the surface temperature of the recording medium when attaching the ink is easily set to 35° C. or lower, evaporation of the solvent component of the ink is further suppressed, the temperature difference between the nozzle surface and the vicinity of the platen is suppressed to be lower. Thus, there is a tendency that dew condensation can be further reduced.

Accordingly, the sheet S subjected to the printing of one frame is intermittently transported to move from the platen 30 to the drying section 4. The drying section 4 can perform a post-heating step of completely drying the treatment liquid and the ink composition landed on the sheet S by air heated for drying.

In the drying section 4, it is preferable to perform heating so that the surface temperature of the sheet S reached is 30.0° C. or higher and 120.0° C. or lower, preferably 40.0° C. or higher and 100.0° C. or lower, more preferably 50.0° C. or higher and 95° C. or lower, and even more preferably 70° C. or higher and 90° C. or lower.

Then, the sheet S subjected to the drying process is intermittently transported to reach the winding section 5 and is wound as the roll R2 onto the winding section.

Figure 7:
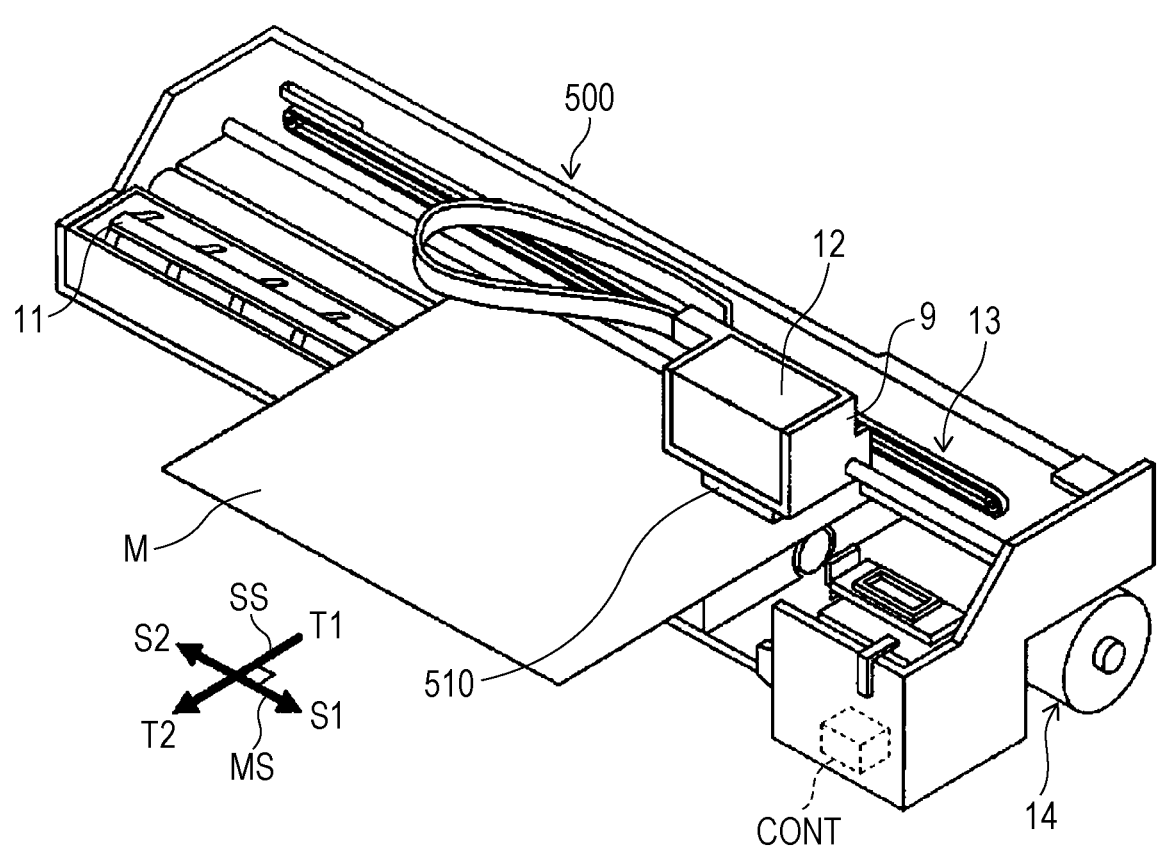
FIG. 7 is a perspective view schematically showing another example of the recording apparatus according to the present embodiment.

FIG. 7 is a schematic perspective view schematically showing another example of the recording apparatus according to the present embodiment. The recording apparatus in FIG. 7 is also an example of a serial type recording apparatus. A recording apparatus 500 includes an ink jet head 510, a carriage housing 9, a carriage main body section 12, a platen 11, a carriage moving mechanism 13, a transport unit 14, and a control section CONT. In the ink jet recording apparatus 500, the operation of the entire ink jet recording apparatus 500 is controlled by the controller CONT.

The ink jet head 510 performs scanning in which the ink is ejected from the nozzles of the ink jet head 510 while the ink jet head is moved in the scanning direction MS. The transport unit 14 transports the recording medium M in the transport direction SS. The ink jet head 510 is attached to the lower surface of the carriage.

FIGS. 8A to 8D are views showing examples of recording according to the present embodiment performed using the recording apparatus in FIG. 7. The ink jet head H is attached to the carriage and has a nozzle row W, nozzle rows C, and a nozzle row R, as in FIGS. 6A to 6D.

The recording medium M is transported onto the platen from above in FIGS. 8A to 8D by the transport unit 14.

Figures 8A, 8B, 8C, 8D:
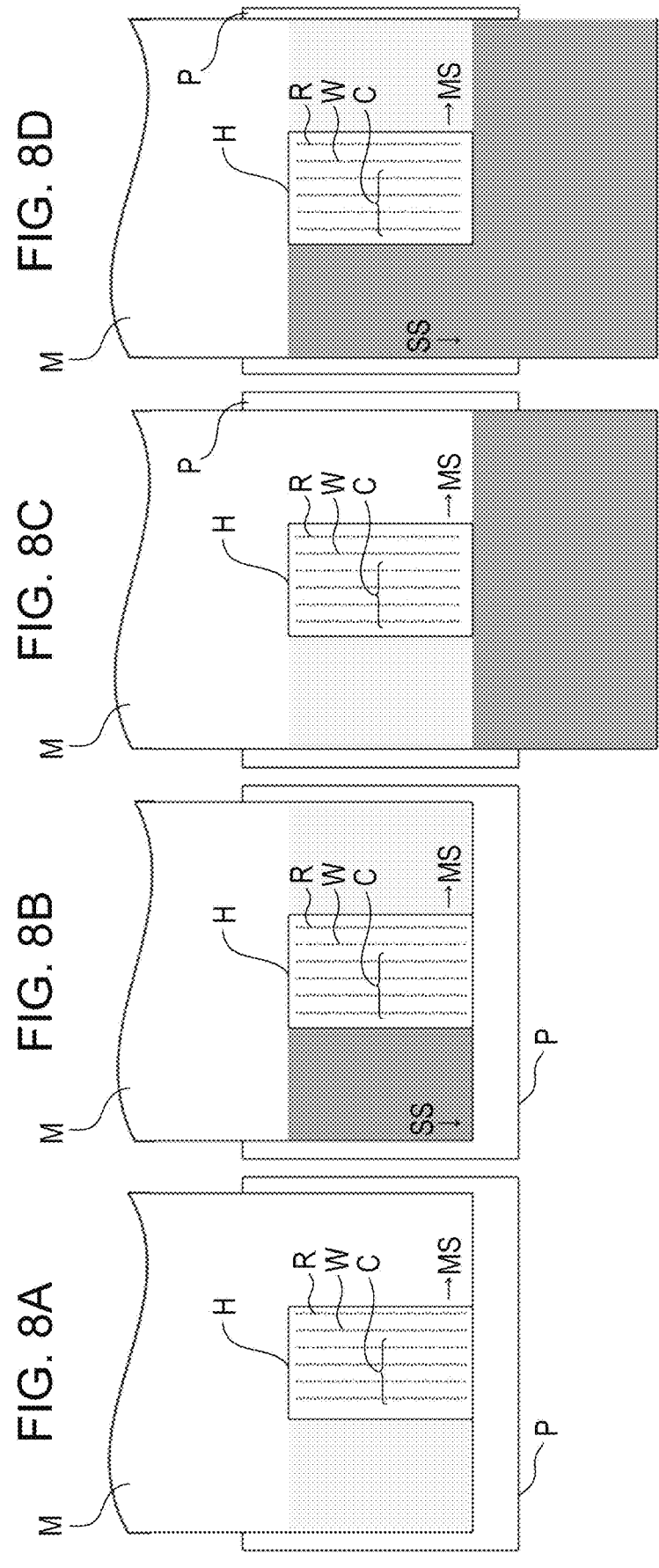
FIGS. 8A to 8D are schematic views showing examples of recording according to the present embodiment performed using the recording apparatus in FIG. 7.

In FIG. 8A, the recording apparatus ejects the white ink composition from the nozzle row W of the ink jet head H onto the surface of the recording medium M while moving the carriage in the forward direction (scanning direction MS), and attaches the white ink composition to the scanning region of one scanning in one scanning. At this time, the recording medium M is stopped on the upper surface of the platen P. In the same scanning as the one scanning, the treatment liquid is ejected from the nozzle row R to the surface of the recording medium M with respect to the same scanning region.

Subsequently, in FIG. 8B, the carriage returns to the initial position, while the carriage is moved again in the scanning direction MS, the non-white ink composition is ejected from the nozzle row C to the surface of the recording medium M, and the non-white ink composition is attached to the scanning region of one scanning in one scanning. Accordingly, the non-white ink is attached to the scanning region to which the white ink composition is attached.

In the same scanning as the one scanning, the treatment liquid is ejected from the nozzle row R to the surface of the recording medium M with respect to the same scanning region.

The carriage does not return to the initial position, and scanning in which the non-white ink composition is attached while the carriage is moved in the backward direction (left direction in the drawing) parallel to the MS-axis direction may be performed in the same manner.

Accordingly, on the surface of the recording medium M, an image of one frame corresponding to the scanning distance in the scanning direction MS is printed at the length of the nozzle row in the transport direction SS. The coloring material of the ink forming the image is aggregated by the action of the treatment liquid and fixed on the surface of the recording medium M.

Next, the recording medium M is transported in the transport direction SS at the length for one frame in the transport direction SS, and the recording medium M for one frame is moved from the platen P.

Next, in FIG. 8C, scanning in which the white ink composition is attached to a new portion of the recording medium M stopped on the upper surface of the platen P is performed. Next, in FIG. 8D, scanning in which the non-white ink composition is attached is performed. The scanning of FIG. 8C and the scanning of FIG. 8D are the same as the scanning of FIG. 8A and the scanning of FIG. 8B, respectively. Accordingly, the image for the next one frame is printed. Further, when recording is continued, the transport of the recording medium M in FIG. 8B and the subsequent steps may be repeated.

Figures 9A, 9B, 9C:
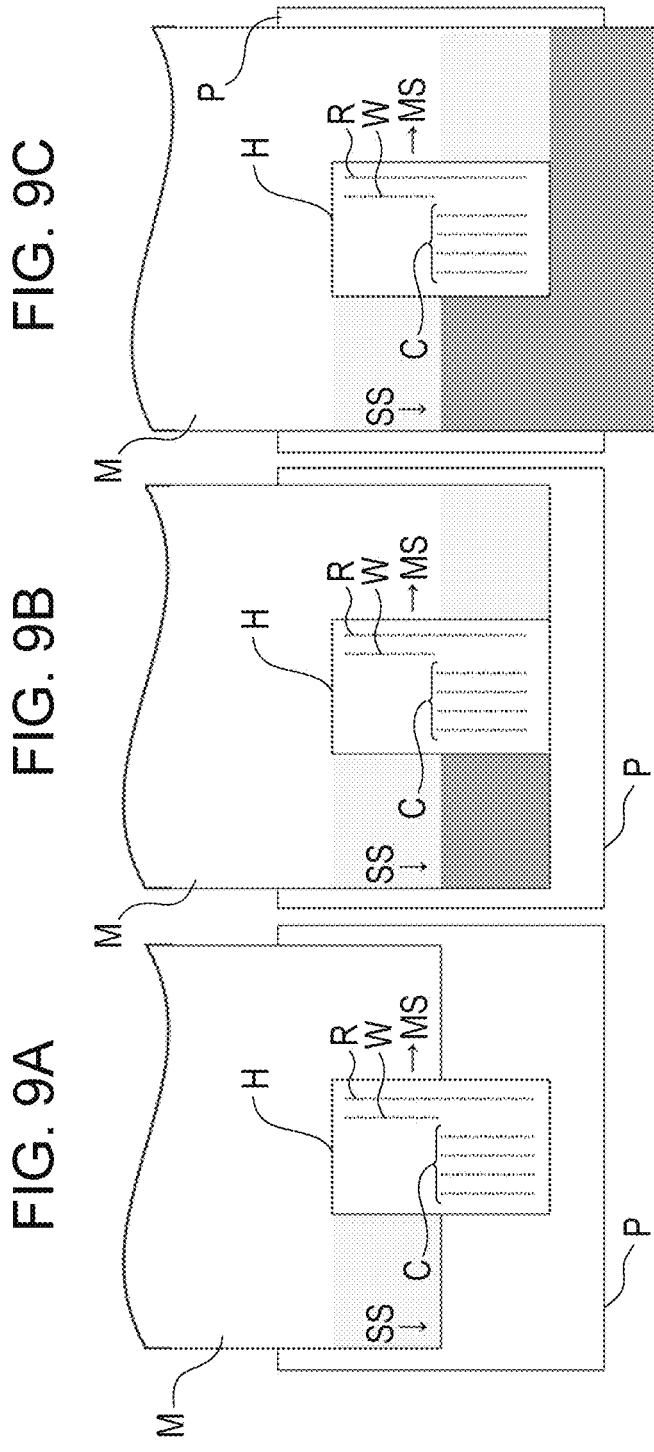
FIGS. 9A to 9C are schematic view showing other examples of the recording according to the present embodiment performed using the recording apparatus in FIG. 7.

FIGS. 9A to 9C are views showing other examples of recording according to the present embodiment performed using the recording apparatus in FIG. 7. The ink jet head H is attached to the carriage and has a nozzle row W arranged on the upstream and a nozzle row C arranged on the downstream along the transport direction SS. The nozzle rows R are arranged on the upstream and downstream. Each of the nozzle rows may be arranged in such a positional relationship, and as in FIGS. 8A to 8D, each of the nozzle rows is arranged from the upstream to the downstream along the transport direction SS. Among these, the nozzle row shown in FIGS. 9A to 9C may be used for recording, and the nozzle row not shown in FIGS. 9A to 9C may not be used for recording. That is, the nozzle rows in FIGS. 9A to 9C are nozzle rows used for recording.

In FIG. 9A, the recording apparatus ejects the white ink composition from the nozzle row W of the ink jet head H onto the surface of the recording medium M while moving the carriage in the forward direction (scanning direction MS), and attaches the white ink composition to the scanning region of one scanning in one scanning. At this time, the recording medium M is stopped on the upper surface of the platen P. In the same scanning as the one scanning, the treatment liquid is ejected from the nozzle row R to the surface of the recording medium M with respect to the same scanning region.

Next, the recording medium M is transported in the transport direction SS by a distance of the length of the nozzle row W along the transport direction SS.

Subsequently, in FIG. 9B, the carriage returns to the initial position, while the carriage is moved again in the scanning direction MS, the non-white ink composition is ejected from the nozzle row C to the surface of the recording medium M, and the non-white ink composition is attached to the scanning region of one scanning in one scanning. Accordingly, the non-white ink is attached to the scanning region to which the white ink composition is attached. At the same time, the nozzle row W attaches the white ink composition to a new portion of the recording medium M in one scanning.

In the same scanning as the one scanning, the treatment liquid is ejected from the nozzle row R to the surface of the recording medium M with respect to the same scanning region.

The carriage does not return to the initial position, and scanning in which the non-white ink composition is attached while the carriage is moved in the backward direction (left direction in the drawing) parallel to the MS-axis direction may be performed in the same manner.

Accordingly, on the surface of the recording medium M, an image of one frame corresponding to the scanning distance in the scanning direction MS is printed at the length of the nozzle row C in the transport direction SS. The coloring material of the ink forming the image is aggregated by the action of the treatment liquid and fixed on the surface of the recording medium M.

Next, the recording medium M is transported in the transport direction SS by a distance of the length of the nozzle row W along the transport direction SS. The length of the nozzle row W and the length of the nozzle row C along the transport direction SS are equal to each other.

Next, the recording medium M is transported in the same manner as in FIG. 9A. Accordingly, the recording medium M for one frame is moved from the platen P.

Next, in FIG. 9C, scanning in which the white ink and the non-white ink are attached is performed. This scanning is the same in the content of the scanning in FIG. 9B. Further, when recording is continued, the transport of the recording medium M in FIG. 9B and the subsequent steps may be repeated.

The examples of the recording in FIGS. 9A to 9C are forms in which the recording medium is transported between the scanning first performed and the scanning performed later out of the scanning in which the white ink is attached and the scanning in which the non-white ink is attached.

3. Examples

Hereinafter, the present disclosure will be described in more detail with reference to examples, but the present disclosure is not limited to these examples. Hereinafter, "%" is based on mass unless otherwise specified. Unless otherwise specified, the evaluation was performed in an environment of a temperature of 25.0° C. and a relative humidity of 40.0%.

3.1 Preparation of Ink and Treatment Liquid

Each component was put in a container so as to have a composition shown in Table 1 (FIG. 3) below, components were mixed and stirred using a magnetic stirrer for 2 hours, and then the mixture was sufficiently mixed by performing a dispersion treatment in a bead mill filled with zirconia beads having a diameter of 0.3 mm. After stirring for 1 hour, the mixture was filtered using a 5.0 μm PTFE membrane filter to obtain white ink compositions (W1 to W4), non-white ink compositions (C1 to C3), and treatment liquids (R1 to R3). The numerical values in Table 1 (FIG. 3) indicate % by mass. Pure water was used as water, and added such that the mass of each ink and the mass of the treatment liquid were 100% by mass. For the pigment and dispersant resin, a dispersion liquid described later was prepared and used.

Among the components shown in Table 1 (FIG. 3), the components other than the compound names are supplemented as follows.

Cationic polymer: "CATIOMASTER PD-7, polyamine resin (epichlorohydrin-amine derivative resin)" manufactured by Yokkaichi Chemical Co., Ltd.

Dispersant resin, Resin A (anionic): acrylic acid-acrylic acid ester copolymer (weight average molecular weight: 25,000, acid value: 25)

Dispersant resin, Resin C (anionic): acrylic acid-acrylic acid ester copolymer (weight average molecular weight: 25,000, acid value: 35)

Carbon black: No. 33 (manufactured by Mitsubishi Chemical Corporation)

Resin particles, styrene-acrylic A: see below (high aggregating property)

Resin particles, styrene-acrylic B: see below (low aggregating property)

Wax, polyethylene-based: "Nopcoat PEM-17" (product name, manufactured by San Nopco)

Surfactant, silicone-based: silicone-based surfactant "BYK348" manufactured by BYK Resin Particles: Preparation of Styrene-Acrylic B Emulsion copolymerization was carried out with 75 parts by mass of styrene, 0.8 parts by mass of acrylic acid, 14.2 parts by mass of methyl methacrylate, and 10 parts by mass of cyclohexyl methacrylate to obtain a resin emulsion B (acid value: 7 mgKOH/g). As a surfactant for emulsion polymerization, Newcol NT-30 (manufactured by Nippon Nyukazai Co., Ltd.) was used, and the usage amount was 2 parts by mass with the total amount of monomers as 100 parts by mass.

Resin particles: Preparation of Styrene-Acrylic A

A resin emulsion A (acid value: 30 mg KOH/g) was obtained in the same manner as described above except that the monomer composition was changed. The amount of the surfactant for emulsion polymerization was 1 part by mass with respect to 100 parts by mass of the total amount of the monomers.

Preparation of Pigment Dispersion Liquid

White Pigment Dispersion Liquid Using Resin A

First, 12 parts by mass of anionic acrylic acid-acrylic acid ester copolymer (weight average molecular weight: 25,000, acid value: 25) as a resin dispersing agent were added to and dissolved in 155 parts by mass of ion exchange water in which 0.1 part by mass of a 30% ammonia aqueous solution (neutralizer) was dissolved. To the above, 40 parts by mass of titanium dioxide (C.I. Pigment White 6), which was a white pigment, were added and a dispersion treatment was performed in a ball mill using zirconia beads for 10 hours. After that, centrifugal filtration was performed using a centrifuge to remove impurities such as coarse particles and dust such that the concentration of the white pigment was adjusted to 20% by mass to obtain a white coloring material dispersion liquid. As for the particle diameter of the white pigment, an average particle diameter was 350 nm.

Non-White Pigment Dispersion Liquid Using Resin C

A non-white coloring material dispersion liquid (black) was obtained in the same manner except that an acrylic acid-acrylic acid ester copolymer (weight average molecular weight: 25,000, acid value: 35) was used as a resin dispersant, carbon black was used as a coloring material, and the amount of the resin dispersant added was set in a manner such that the mass ratio of the resin dispersant to the pigment was the mass ratio in Table 1 (FIG. 3). As for the particle diameter of the pigment, the average particle diameter was 60 nm.

3.2. Evaluation Method 3.2.1 Thickening Ratio

The "thickening ratio when mixed with test liquid under same conditions as R1" shown in Table 1 (FIG. 3) refers to a ratio of the viscosity of the ink after mixing to the viscosity of the ink before mixing when the viscosity was measured using a rheometer MCR302, manufactured by Anton Paar) at 25° C. and a shear rate of 200 s$^{-1}$ after each ink and the treatment liquid R1 were mixed at a mass ratio of 10:1 and stirred for 1 minute.

3.2.2 Recording Test

A modified machine L-4733AW, manufactured by Seiko Epson Corporation, including an ink jet head having a length of the width of a recording medium and capable of performing recording across the recording medium width in 1 pass, was prepared. The configuration is as shown in FIG. 1. Recording was performed as shown in FIGS. 6A to 6D. Each ink was recorded in 1 pass (1 pass of white ink, 1 pass of color ink, 2 passes in total) on a recording medium (PET 50A, manufactured by LINTEC Corporation) fixed on a print stage (platen). The pass is scanning. The treatment liquid was attached by simultaneous strike for each of the step of attaching the white ink and the step of attaching the color ink. After the recording of the total of 2 passes, the recording medium was transported by the length of the print stage, a new portion was moved onto the print stage, and the next recording was performed. At this time, the transport direction and the scanning direction of the recording medium were set to the same axial direction (for example, the X-axis direction in FIG. 1).

Note that, for Reference Examples 3 and 4 in Tables 3-1 and 3-2 (FIGS. 5A and 5B), recording was performed by a line type recording method in which an attachment step of each ink is performed while transporting a recording medium. In the line type recording, the position of the ink jet head of the modified machine was fixed to the vicinity of the center on the platen in the X-axis direction, while the recording medium was transported in the transport direction, the ink or the like was ejected from the ink jet head to perform recording. Reference Example 3 has the same conditions as Comparative Example 1 and Reference Example 4 has the same conditions as Example 1 except that recording is performed by a line type.

In examples in which the medium surface temperature was 25° C. in Tables 2-1 to 3-2 (FIGS. 4A to 5B), the platen heater was turned off and heating was not performed on the platen. On the other hand, in examples in which the medium surface temperature was 28° C. or higher, the platen heater was turned on so as to adjust the medium surface temperature in Tables 2-1 to 3-2 (FIGS. 4A to 5B).

For the head movement distance in Tables 2-1 to 3-2 (FIGS. 4A to 5B), the length of the recording medium on the stage (for example, the X-axis direction in FIG. 1) was the value in the tables. In addition, in an example in which the head movement distance was changed from 0.5 m, the length of the print stage in the main scanning direction was changed was prepared.

The width of the recording medium to be used (for example, the length of the recording medium in the Y-axis direction in FIG. 1) was 30 cm. At this time, the length of the ink jet head (nozzle row) was longer than 30 cm.

The test pattern was a recording pattern except for a margin of 5 mm on four sides of the recording medium on the stage.

The nozzle density of the ink jet head was 1, 200 dpi. Then, the basic resolution in 1 pass recording was set to 1,200×1,200 dip, the number of ink droplets to be actually attached was adjusted for each pixel, and the ink attachment amount [mg/inch$^2$] was adjusted to the values in Tables 2-1 to 3-2 (FIGS. 4A to 5B). The weight per ink droplet (Iw [ng/dot]) was set to the values in Tables 2-1 to 3-2 (FIGS. 4A to 5B).

Secondary heating was performed by heating the recording medium to 70° C. by a secondary heater on the downstream in the transport direction of the recording medium.

3.2.3 Evaluation of Filling and Pinhole

A solid image region of the recorded matter was visually observed under a fluorescent lamp and evaluated according to the following criteria. The evaluation of the white ink was performed at a portion of the recording pattern to which the white ink composition and the treatment liquid were attached and the non-white ink composition and the treatment liquid were not attached. The evaluation of the non-white ink was performed at the portion of the recording pattern to which the white ink composition and the treatment liquid were attached, and the non-white ink composition and the treatment liquid were attached in an overlapping manner.

A: There is no unfilled portion or pinhole.

B: Some unfilled portions or pinholes are visible.

C: Unfilled portions and pinholes are remarkably visible.

3.2.4 Evaluation of Density Unevenness

A solid image region of the recorded matter was visually observed under a fluorescent lamp and evaluated according to the following criteria.

The recording pattern used for the evaluation of the white ink and the recording pattern used for the evaluation of the non-white ink were evaluated in the same manner as in the evaluation of filling and pinholes.

A: There is no bleeding (density unevenness).

B: Bleeding (density unevenness) is slightly visible.

C: Bleeding (density unevenness) is remarkably visible.

3.2.5 Evaluation of 3 pt Character

White Characters

A non-white solid image was created on a white solid image, and white characters (3 pt) were formed in a portion without a non-white ink in the non-white solid image. Then, the bleeding at the boundary between the white ink and the non-white ink was observed. Evaluation was performed according to the following evaluation criteria. The results are described in the white areas in the table.

A: No color bleeding is present at the boundary of the white characters.

B: Slight bleeding with the color is present at the boundary of the white characters.

C: Bleeding with the color is present at the boundary of the white characters.

Non-White Characters

Characters (3 pt) were recorded on a white solid image with a non-white ink. Then, the thinning and discontinuity of the lines of the non-white characters were evaluated. The non-white characters were evaluated according to the following evaluation criteria. The results are described in the non-white areas in the table.

A: The non-white characters on the white solid are clearly read.

B: Slight discontinuities of the non-white characters on the white solid are present.

C: There are discontinuities in the non-white characters on the white solid.

3.2.6 Dew Condensation Evaluation

Image recording was continuously performed for 1 hour under the conditions shown in Tables 2-1 to 3-2 (FIGS. 4A to 5B), the nozzles of the ejection nozzle group after the end of the recording were inspected and the nozzle surface was observed. Then, evaluation was performed according to the following evaluation criteria. A case where non-ejection or flight bending of equal to or more than half of the distance between adjacent nozzles occurred was defined as ejection failure. The ink comes into contact with dew condensation, and flight bending or the like occurs.

A: No dew condensation on the nozzle surface. No nozzles with ejection failure.

B: No dew condensation on the nozzle surface. 1% or less of nozzles with ejection failure.

C: Slight dew condensation occurs on the nozzle surface. More than 1% and 3% or less of nozzles with ejection failure.

D: Significant dew condensation occurs on the nozzle surface. More than 3% of nozzles with ejection failure.

3.2.7 Evaluation of Recording Speed

Based on the number of pass in one recording, evaluation was performed according to the following evaluation criteria.

A: The number of pass of one recording is 2 or less.

B: The number of pass of one recording is 3 or more.

3.3 Evaluation Results

The evaluation results are shown in Tables 2-1 to 3-2 (FIGS. 4A to 5B).

From Tables 2-1 to 3-2 (FIGS. 4A to 5B), according to the recording method of each example including a treatment liquid attachment step of attaching a treatment liquid containing an aggregating agent to a recording medium, a white ink attachment step of ejecting a white ink composition containing a white coloring material from an ink jet head and attaching the white ink composition to the recording medium, and a non-white ink attachment step of ejecting a non-white ink composition containing a non-white coloring material from the ink jet head and attaching the non-white ink composition to the recording medium, in which the white ink composition and the non-white ink composition are aqueous inks, the white ink attachment step and the non-white ink attachment step are each performed by scanning in which the ink composition is ejected from the ink jet head and attached to the recording medium while the ink jet head is moved with respect to the recording medium in a state where a position is fixed, in the white ink attachment step, the white ink composition is attached to a scanning region of one scanning in one scanning, in the non-white ink attachment step, the non-white ink composition is attached to a scanning region of one scanning in one scanning, on the scanning region in which scanning in one of the white ink attachment step and the non-white ink attachment step is performed, scanning in another step is performed by another scanning, and in the white ink attachment step and the non-white ink attachment step, a surface temperature of the recording medium is 35° C. or lower, it was found that dew condensation was suppressed while providing an excellent recording speed, and the image quality (density unevenness) was excellent.

On the other hand, in the recording method of each comparative example, which is not the above recording method, any of the recording speed, the suppression of dew condensation, and the image quality (density unevenness) was inferior. Moreover, the recording method of each reference example, which is not the above recording method, does not have the problem of the present disclosure.

From comparison between Example 1 and Comparative Example 1, when the surface temperature of the recording medium was not 35° C. or lower, the dew condensation evaluation was inferior.

From comparison between Example 1 and Comparative Example 2, when the treatment liquid attachment step was not provided, the image quality (density unevenness) was inferior.

From comparison between Example 1 and Comparative Examples 3 to 5, when the white ink composition was not attached to the scanning region of one scanning in one scanning in the white ink attachment step, the recording speed was inferior.

Referring to Reference Examples 1 and 2, when the white ink attachment step was not provided, there were no problems in recording speed, suppression of dew condensation, and image quality (density unevenness).

Referring to Reference Examples 3 and 4, there was no problem such as dew condensation in printing by the line type recording method. However, during the recording, there was no time during which the ink jet head did not face the recording medium.

From the results of Examples 1, 2 and 3, when the reactivity of the treatment liquid was within a predetermined range, the filling and pinhole, the density unevenness, and the 3 pt character could be well-balanced and satisfactory.

From the results of Examples 1, 4, and 5, Examples 13 and 17, and Examples 1, 9, and 10, when the water content of the white ink composition and the non-white ink composition was within a predetermined range, the filling and pinhole and the density unevenness could be well-balanced and satisfactory.

From the results of Examples 1 and 6, when the reactivity of the white ink composition was within a predetermined range, the density unevenness and 3 pt character could be well-balanced and satisfactory.

From the results of Examples 1, 7, and 16, when the attachment amount of the white ink composition was within a predetermined range, the filling and pinhole, the density unevenness, the 3 pt character, and the dew condensation evaluation could be well-balanced and satisfactory.

From the results of Examples 1 and 8, when the weight per droplet of the treatment liquid was within a predetermined range, the filling and pinhole, and the 3 pt character could be well-balanced and satisfactory.

From the results of Examples 1 and 11 and Examples 13, 14, and 15, even when the head movement distance was long and dew condensation easily occurred, the dew condensation could be satisfactorily suppressed.

From the results of Example 1, 12, and 13, as the medium surface temperature was closer to the ambient temperature, the image quality and the suppression of dew condensation became more satisfactory.

From the results of Examples 13 and 18, satisfactory suppression of dew condensation and image quality (density unevenness) were obtained regardless of the order of the ink attachment step.

From the results of Examples 13 and 19, when the weight per droplet of the white ink composition was within a predetermined range, the suppression of dew condensation was more excellent.

Although not described in the table, when the recording in FIGS. 8A to 9C is performed using the recording apparatus in FIG. 7 with the inks of each example under the recording conditions of each example, all of the recording speed, the suppression of dew condensation, and the image quality were excellent.

The following contents are derived from the above-described embodiments.

A recording method according to an aspect includes a treatment liquid attachment step of attaching a treatment liquid containing an aggregating agent to a recording medium, a white ink attachment step of ejecting a white ink composition containing a white coloring material from an ink jet head and attaching the white ink composition to the recording medium, and a non-white ink attachment step of ejecting a non-white ink composition containing a non-white coloring material from the ink jet head and attaching the non-white ink composition to the recording medium, in which the white ink composition and the non-white ink composition are aqueous inks, the white ink attachment step and the non-white ink attachment step are each performed by scanning in which the ink composition is ejected from the ink jet head and attached to the recording medium while the ink jet head is moved with respect to the recording medium in a state where a position is fixed, in the white ink attachment step, the white ink composition is attached to a scanning region of one scanning in one scanning, in the non-white ink attachment step, the non-white ink composition is attached to a scanning region of one scanning in one scanning, on the scanning region in which scanning in one of the white ink attachment step and the non-white ink attachment step is performed, scanning in another step is performed by another scanning, and in the white ink attachment step and the non-white ink attachment step, a surface temperature of the recording medium is 35° C. or lower.

In the recording method according to the above aspect, a maximum attachment amount range of the ink composition in a step which is first performed out of the white ink attachment step and the non-white ink attachment step may be 8 mg/inch$^2$ or more.

In the recording method according to the above aspect, a viscosity increase when the treatment liquid and the white ink composition are mixed at a mass ratio of treatment liquid:white ink composition=1:10 in the white ink composition, and a viscosity increase when the treatment liquid and the non-white ink composition are mixed at a mass ratio of treatment liquid:non-white ink composition=1:10 in the non-white ink composition may each be 5 times or more.

In the recording method according to the above aspect, a distance at which the ink jet head moves while facing the recording medium in the one scanning may be 0.5 m or more.

In the recording method according to the above aspect, in the white ink attachment step and the non-white ink attachment step, a maximum weight range per droplet of liquid droplets of each of the white ink composition and the non-white ink composition may be 0.5 to 15 ng.

In the recording method according to the above aspect, on the scanning region in which the scanning in one of the white ink attachment step and the non-white ink attachment step is performed, the scanning in the other step may be performed without performing a transport step of transporting the recording medium.

In the recording method according to the above aspect, the ink jet head has a nozzle row formed of a plurality of nozzles that eject an ink composition, and a length of the nozzle row in a length direction may be equal to or longer than a length of a recordable region of the recording medium in the direction.

The recording method according to the above aspect may further include a transport step of transporting the recording medium after the scanning of the white ink attachment step and the scanning of the non-white ink attachment step, and a transport direction of the transport step may be a direction extending along an axis of a scanning direction of the scanning.

In the recording method according to the above aspect, the treatment liquid attaching step is performed by scanning in which the treatment liquid is ejected from the ink jet head and attached to the recording medium while the ink jet head is moved, and in the white ink attachment step and the non-white ink attachment step, scanning in which the treatment liquid is attached may be performed on the same scanning region by the same scanning as the scanning in which each ink composition is attached.

In the recording method according to the above aspect, the ink jet head may have a nozzle density of 600 dpi or more.

In the recording method according to the above aspect, the recording medium may not be heated by a heating mechanism for heating the recording medium provided in a member supporting the recording medium, and the recording medium may not be heated by a heating mechanism for heating the recording medium from above at a location where the ink composition is attached.

A recording apparatus according to another aspect is a recording apparatus that performs recording by the recording method of any of the above aspects, and includes the treatment liquid, the white ink composition, the non-white ink composition, and the ink jet head.

The present disclosure is not limited to the above-mentioned embodiments, and various modifications can be made. For example, the present disclosure includes a configuration substantially the same as the configuration described in the embodiment, for example, a configuration having the same function, method, and effect, or a configuration having the same object and effect. Further, the present disclosure includes configurations in which non-essential parts of the configuration described in the embodiments are replaced. In addition, the present disclosure includes configurations that achieve the same operational effects or configurations that can achieve the same objects as those of the configurations described in the embodiments. Further, the present disclosure includes configurations in which a known technology is added to the configurations described in the embodiments.

What is claimed is:

1. A recording method comprising:

a treatment liquid attachment step of attaching a treatment liquid containing an aggregating agent to a recording medium;

a white ink attachment step of ejecting a white ink composition containing a white coloring material from an ink jet head and attaching the white ink composition to the recording medium; and a non-white ink attachment step of ejecting a non-white ink composition containing a non-white coloring material from the ink jet head and attaching the non-white ink composition to the recording medium, wherein the white ink composition and the non-white ink composition are aqueous inks, the white ink attachment step and the non-white ink attachment step are each performed by scanning in which the ink composition is ejected from the ink jet head and attached to the recording medium while the ink jet head is moved with respect to the recording medium in a state where a position is fixed, in the white ink attachment step, the white ink composition is attached to a scanning region of one scanning in one scanning, in the non-white ink attachment step, the non-white ink composition is attached to a scanning region of one scanning in one scanning, on the scanning region in which scanning in one of the white ink attachment step and the non-white ink attachment step is performed, scanning in another step is performed by another scanning, in the white ink attachment step and the non-white ink attachment step, a surface temperature of the recording medium is 35° C. or lower, and a viscosity increase when the treatment liquid and the white ink composition are mixed at a mass ratio of treatment liquid:white ink composition=1:10 in the white ink composition, and a viscosity increase when the treatment liquid and the non-white ink composition are mixed at a mass ratio of treatment liquid:non-white ink composition=1:10 In the non-white ink composition are each 5 times or more.

2. The recording method according to claim 1, wherein a maximum attachment amount range of the ink composition in a step which is first performed out of the white ink attachment step and the non-white ink attachment step is 8 mg/inch$^2$ to 25 mg/inch$^2$.

3. The recording method according to claim 1, wherein the viscosity increase when the treatment liquid and the white ink composition are mixed at a mass ratio of treatment liquid:white ink composition=1:10 in the white ink composition, and the viscosity increase when the treatment liquid and the non-white ink composition are mixed at a mass ratio of treatment liquid:non-white ink composition=1:10 in the non-white ink composition are each 5 times or more and 20 times or less.

4. The recording method according to claim 1, wherein a distance at which the ink jet head moves while facing the recording medium in the one scanning is 0.5 m or more.

5. The recording method according to claim 1, wherein in the white ink attachment step and the non-white ink attachment step, a maximum weight range per droplet of liquid droplets of each of the white ink composition and the non-white ink composition is 0.5 to 15 ng.

6. The recording method according to claim 1, wherein on the scanning region in which the scanning in one of the white ink attachment step and the non-white ink attachment step is performed, the scanning in the other step is performed without performing a transport step of transporting the recording medium.

7. The recording method according to claim 1, wherein the ink jet head has a nozzle row formed of a plurality of nozzles that eject an ink composition, and a length of the nozzle row in a length direction is equal to or longer than a length of a recordable region of the recording medium in the direction.

8. The recording method according to claim 7, further comprising:

a transport step of transporting the recording medium after the scanning of the white ink attachment step and the scanning of the non-white ink attachment step, wherein a transport direction of the transport step is a direction extending along an axis of a scanning direction of the scanning.

9. The recording method according to claim 1, wherein the treatment liquid attachment step is performed by scanning in which the treatment liquid is ejected from the ink jet head and attached to the recording medium while the ink jet head is moved, and in the white ink attachment step and the non-white ink attachment step, scanning in which the treatment liquid is attached is performed on the same scanning region by the same scanning as the scanning in which each ink composition is attached.

10. The recording method according to claim 1, wherein the ink jet head has a nozzle density of 600 dpi or more.

11. The recording method according to claim 1, wherein the recording medium is not heated by a heating mechanism for heating the recording medium provided in a member supporting the recording medium, and the recording medium is not heated by a heating mechanism for heating the recording medium from above at a location where the ink composition is attached.

12. A recording apparatus that performs recording using the recording method according to claim 1, comprising:

the treatment liquid;

the white ink composition;

the non-white ink composition; and the ink jet head.

* * * * *